(12) United States Patent
Widdowson et al.

(10) Patent No.: US 10,195,980 B2
(45) Date of Patent: Feb. 5, 2019

(54) SYSTEM FOR IMAGING

(71) Applicant: Jaguar Land Rover Limited, Whitley Coventry, Warwickshire (GB)

(72) Inventors: Paul Widdowson, Kenilworth (GB); Mark Cund, Inkberrow (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 13 days.

(21) Appl. No.: 14/915,963

(22) PCT Filed: Sep. 3, 2014

(86) PCT No.: PCT/EP2014/068688
§ 371 (c)(1),
(2) Date: Mar. 2, 2016

(87) PCT Pub. No.: WO2015/032795
PCT Pub. Date: Mar. 12, 2015

(65) Prior Publication Data
US 2016/0207443 A1    Jul. 21, 2016

(30) Foreign Application Priority Data

Sep. 3, 2013 (GB) .................... 1315613.8
Sep. 3, 2013 (GB) .................... 1315614.6
Sep. 3, 2013 (GB) .................... 1315615.3

(51) Int. Cl.
*B60Q 1/00* (2006.01)
*B60Q 1/02* (2006.01)
*B60Q 1/50* (2006.01)

(52) U.S. Cl.
CPC .............. *B60Q 1/0011* (2013.01); *B60Q 1/02* (2013.01); *B60Q 1/50* (2013.01); *B60Q 2400/50* (2013.01)

(58) Field of Classification Search
CPC .......... B60Q 1/0011; B60Q 1/02; B60Q 1/50; B60Q 2400/50
(Continued)

(56) References Cited

U.S. PATENT DOCUMENTS 5,165,774 A   11/1992   Windross
5,791,757 A    8/1998   O'Neil et al.
(Continued)

FOREIGN PATENT DOCUMENTS

CH       695857 A5    9/2006
DE     10034381 A1    1/2002
(Continued)

OTHER PUBLICATIONS

Combined Search and Examination Report corresponding to application No. GB1315614.6, dated Mar. 17, 2014, 7 pages.
(Continued)

*Primary Examiner* — Jack K Wang
(74) *Attorney, Agent, or Firm* — Reising Ethington P.C.

(57) ABSTRACT

A system (90) for emitting shaped light (26) from a vehicle (10) and for projecting the shaped light (26) onto a surface (18) external to the vehicle (10), the system comprising a controller, one or more light sources and at least one light emitter, wherein the at least one light emitter is arranged to emit at least a first light signal directed towards said surface (18) external to the vehicle (10), the light emitter comprising a projection head arranged to direct light externally to the vehicle (10) and a beam shaper element, wherein the at least one light emitter is coupled to at least one of said light sources by one or more optical fibers.

20 Claims, 14 Drawing Sheets

(58) Field of Classification Search
USPC .......................................................... 340/468
See application file for complete search history.

(56) References Cited

U.S. PATENT DOCUMENTS

| | | | |
|---|---|---|---|
| 5,828,299 | A | 10/1998 | Chen |
| 6,733,134 | B2 | 5/2004 | Bleiner |
| 7,175,321 | B1 * | 2/2007 | Lopez ............... B60Q 1/50 |
| | | | 296/21 |
| 7,347,595 | B2 | 3/2008 | Brun et al. |
| 7,862,177 | B2 | 1/2011 | Kubota et al. |
| 8,007,147 | B2 | 8/2011 | Lin |
| 8,256,947 | B2 | 9/2012 | Harle et al. |
| 8,260,536 | B2 | 9/2012 | Stefani |
| 8,325,027 | B2 | 12/2012 | Tee et al. |
| 8,733,939 | B2 | 5/2014 | Othmer |
| 2003/0147247 | A1 * | 8/2003 | Koike ................ B60Q 1/484 |
| | | | 362/464 |
| 2005/0117364 | A1 | 6/2005 | Rennick et al. |
| 2008/0198372 | A1 * | 8/2008 | Pan .................... B60Q 1/38 |
| | | | 356/121 |
| 2009/0013922 | A1 | 1/2009 | Lin |
| 2009/0033474 | A1 | 2/2009 | Chen |
| 2010/0283590 | A1 * | 11/2010 | Tee .................... A42B 3/044 |
| | | | 340/432 |
| 2010/0295670 | A1 | 11/2010 | Sato et al. |
| 2011/0260848 | A1 | 10/2011 | Rodriguez Barros et al. |
| 2012/0044090 | A1 | 2/2012 | Kahler et al. |
| 2012/0194356 | A1 * | 8/2012 | Haines ................ G08G 1/161 |
| | | | 340/933 |
| 2013/0051040 | A1 | 2/2013 | Kracker et al. |
| 2013/0120130 | A1 | 5/2013 | Cha |
| 2014/0043622 | A1 * | 2/2014 | Vandenhoudt ........... G01S 3/78 |
| | | | 356/614 |

FOREIGN PATENT DOCUMENTS

| | | |
|---|---|---|
| DE | 102006029203 A1 | 12/2007 |
| DE | 102006050548 A1 | 4/2008 |
| EP | 1442927 A1 | 8/2004 |
| EP | 1862989 A2 | 12/2007 |
| EP | 1916153 A2 | 4/2008 |
| EP | 2562046 A2 | 2/2013 |
| EP | 2689966 A1 | 7/2013 |
| FR | 1211324 A | 3/1960 |
| FR | 2753426 A1 | 3/1998 |
| FR | 2823477 A1 | 10/2002 |
| FR | 2967625 A1 | 5/2012 |
| GB | 323918 A | 10/1998 |
| GB | 2342212 A | 4/2000 |
| GB | 2482951 A | 2/2012 |
| GB | 2491258 A | 11/2012 |
| JP | H082342 A | 1/1996 |
| WO | WO2007119153 A2 | 10/2007 |
| WO | WO2011029673 A1 | 3/2011 |

OTHER PUBLICATIONS

Combined Search and Examination Report corresponding to application No. GB1315615.3, dated Mar. 18, 2014, 7 pages.
International Search Report corresponding to International application No. PCT/EP2014/068688, dated Jan. 22, 2015, 6 pages.
Written Opinion corresponding to International application No. PCT/EP2014/068688, dated Jan. 22, 2015, 8 pages.
Combined Search and Examination Report corresponding to application No. GB1415555.0, dated Feb. 27, 2015, 10 pages.

* cited by examiner

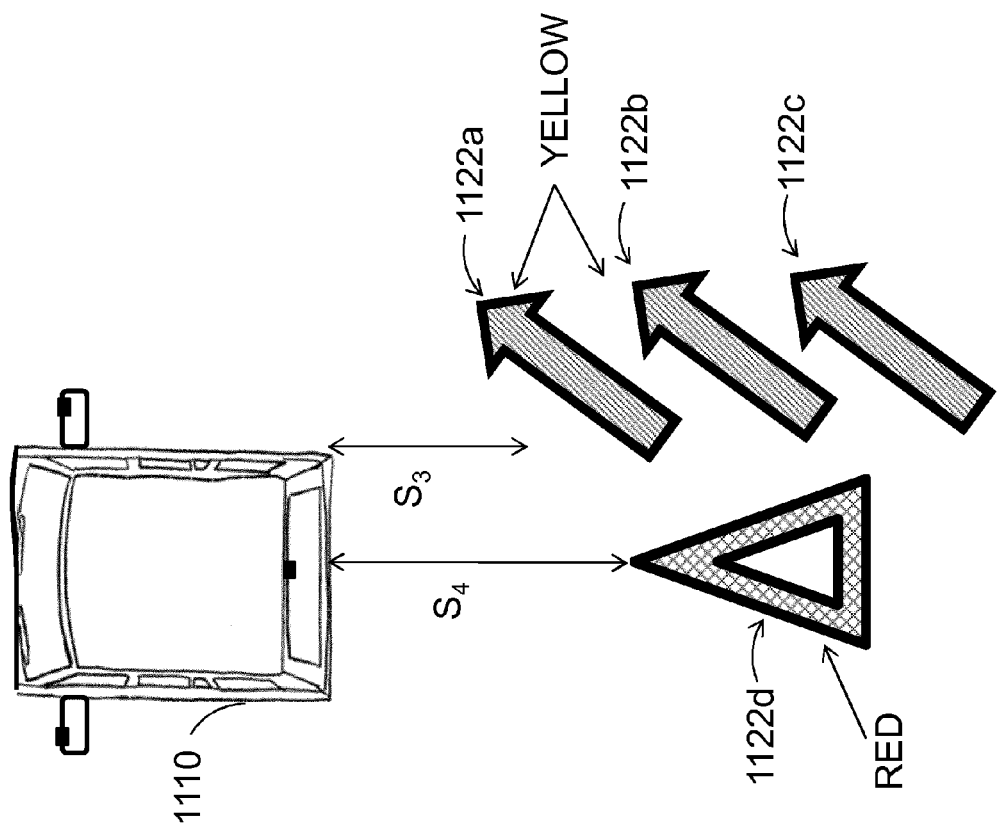

SYSTEM FOR IMAGING

TECHNICAL FIELD

The present disclosure relates to a system for use on a vehicle for emitting externally of the vehicle visible warnings, references, images or icons. More particularly, but not exclusively, the invention relates to a system for emitting light from a stationary or moving vehicle and projecting the light to create a static or dynamic visible reference, image or icon for improving driver control of the vehicle and/or for communicating with or providing a warning to other users of the road. Aspects of the invention relate to a vehicle, to a system, to a program and to a method.

BACKGROUND

Drivers of vehicles sometimes cannot accurately gauge: distances ahead of or to the side of their vehicle; the position or size of their vehicle relative to other road users (such as other vehicles and cyclists); and the position or size of their vehicle relative to reduced road widths (such as gaps between cars parked on each side of a road). The difficulty in accurately gauging distances is emphasised when the distance the driver is attempting to gauge is changing; for example, due to the driver's vehicle moving, and/or another vehicle or road user moving, and/or the road having a variable, non-uniform width. It is desirable therefore to assist the driver of a vehicle in more accurately assessing whether sufficient space is available for their vehicle.

In typical motor vehicles, the way in which one road user communicates with other users of the road and pedestrians around him is limited to using: indicator and warning lights that are provided on the vehicle itself (for example, the left and right indicators, brake lights, reverse lights and hazard warning lights); a horn provided on the vehicle to sound an alert; hand gesturing; miming or lip reading between drivers; and flashing of headlights. The use of some of these "external alerts" is governed by the Highway Code and their use is clear. However, the use of some of these external alerts, for example hand gesturing and flashing of headlights can be confusing and can give rise to further uncertainty. Consider, for example, the situation of two vehicles travelling in opposite directions and both approaching a narrowing in the road. One driver may gauge the available gap ahead to be insufficient for his car and the oncoming vehicle and he may flash the headlights of his vehicle to indicate that the oncoming vehicle can progress through the gap first. However, if the driver of the oncoming vehicle gauges the gap to be sufficient for both cars, he may not understand the intended meaning behind the flash of headlights and may stop to investigate whether there is a problem with his vehicle to which the other driver was attempting to alert him. Such an example may only lead to an inconvenience as both vehicles come to a halt, but it will be recognised that more serious consequences can arise to due ineffective or misleading communications between vehicle drivers.

Additionally, the external alerts are limited in the information they can convey and in the clarity of that information. There are many situations where a typical known vehicle has no means at all, or no convenient and/or clear means, of communicating the intentions of the driver or other users of the vehicle to third party users of the road or to pedestrians. For example, when an occupant of a stationary vehicle exits the vehicle, accidents can occur if a pedestrian, cyclist or other road user fails to give the occupant sufficient room to open their door to exit the vehicle. Similarly, accidents can occur if the occupant does not carefully consider the approach of cyclists, pedestrians and other road users before opening the door.

Furthermore, even well understood external alerts, such as hazard warning lights provided on a broken down vehicle, can be deficient because other vehicles on the road need to be in relatively close proximity to the broken down car before seeing the hazard warning light. On motorways, where other vehicles are travelling at relatively high speed, the lateness with which the hazard warning lights are noticed can be too late to prevent a collision with the broken down vehicle.

Additionally, there are many situations where a typical known vehicle has no means of communicating the intentions of the driver of the vehicle to other users of the road or to pedestrians. It is desirable therefore to improve the way in which drivers of a vehicle can communicate to other road users and to improve the effectiveness and clarity of such communications.

SUMMARY OF THE INVENTION

Aspects of the invention provide a vehicle, a system, a method and a program as claimed in the appended claims.

According to an aspect of the invention for which protection is sought, there is provided a system for emitting shaped light from a vehicle and projecting the shaped light onto a surface external to the vehicle, the system comprising a controller, one or more light sources and at least one light emitter, wherein the at least one light emitter is arranged to emit at least a first light signal directed towards said surface external to the vehicle, the light emitter comprising a projection head arranged to direct light externally to the vehicle and a beam shaper element, wherein the at least one light emitter is coupled to at least one of said light sources by one or more optical fibres.

According to another aspect of the invention for which protection is sought, there is provided a vehicle comprising a system for emitting shaped light and for projecting the emitted shaped light onto a surface external to the vehicle, the projected shaped light thereby forming one or more visible images on said surface external to the vehicle, which one or more visible images comprise: a moving element and/or a coloured element and/or a graphical referencing element, suitable for communicating an intention of the driver of the vehicle and/or for assisting a driver of the vehicle in gauging a distance relative to the vehicle.

Optionally, the system comprises a controller and at least one light emitter mounted to the vehicle, wherein the at least one light emitter: comprises a projection head; comprises or is coupled to one or more light sources; comprises a beam shaper element; and is structured and arranged to emit at least a first light signal directed toward said surface external to the vehicle.

Optionally, the controller is configured to receive first data relating to the orientation of the vehicle in three-dimensions and is configured to control the output of the or each light emitter such that the projected shaped light emitted by the system is appropriately positioned and arranged on said surface external to the vehicle and at an appropriate distance from the vehicle.

Additionally or alternatively, the controller is configured to receive first data relating to the orientation of the vehicle in three-dimensions; and is configured to receive second data relating to the orientation in three dimensions of the projection head and/or beam shaper element of the or each light emitter and in dependence upon said first data and said second data, the controller is configured to compute or determine an appropriate orientation of the projection head and/or beam shaper element of the or each light emitter such that the projected shaped light emitted by the system is appropriately positioned on said surface external to the vehicle and at an appropriate distance from the vehicle.

Optionally, the controller is configured to receive third data relating to the angle of the steering wheel and/or relating to the angle of the road wheels that steer the vehicle and the controller is configured to compute or determine an appropriate orientation of the projection head of the or each light emitter in dependence upon said third data, such that the projected shaped light emitted by the system is appropriately positioned relative to the vehicle.

Optionally, the one or more visible images comprises a visible image projected in front of the vehicle and a part of the visible image that is disposed closest to the vehicle is spaced from the vehicle by a distance. Said distance may be at least 6 m.

Optionally, the one or more light sources are coherent or incoherent light sources and comprise any one or more, or an array, or a combination of: a laser, a light emitting diode (an LED) and an incandescent light source.

Optionally, the at least one light emitter is coupled to the one or more light sources by one or more optical fibres and the one or more light sources comprises a plurality of light sources disposed together within a protective housing.

Optionally, the plurality of light sources are disposed together within a protective housing disposed within the boot of the vehicle and the plurality of light sources are coupled to a power source and to a cooling means for controlling the temperature of the plurality of light sources.

Each of the at least one light emitters may be coupled to the plurality of light sources by one or more optical fibres and may be coupled via a combining means and a switching means, the controller may be coupled to each light source of the plurality of light sources for activating and deactivating each light source and the controller may be coupled to the switching means for selecting a colour of light to be transmitted via the one or more optical fibres to each of the at least one light emitters.

The beam shaper element may comprise any one or a combination of: a transmissive LCD, a lens, a collimator, a diffuser, a mask, a gobo, a static slide, a scanning device, a beam scanner, a rastering device and/or a vectoring device.

Optionally, the scanning device, rastering device or vectoring device comprises any one or more or a combination of: a mirror galvanometer scanner, a MEMS scanner, an acousto-optic modulator and a piezo-driven scanner The controller may be configured to receive first data relating to the orientation of the vehicle in three-dimensions; and in dependence upon said first data, the controller may be configured to appropriately control the scanning device or rastering device or vectoring device such that the projected shaped light emitted by the system is appropriately positioned on said surface external to the vehicle and at an appropriate distance from the vehicle.

Optionally, the system further comprises at least one moveable mounting means, each moveable mounting means for mounting to the vehicle a portion of an optical fibre and/or the beam shaper element and/or the projection head of one of said at least one light emitters, and wherein the moveable mounting means is structured and arranged for moving the optical fibre and/or the beam shaper element and/or the projection head and/or one or more components of the beam shaper element to thereby provide said one or more visible images.

The controller may be coupled to each moveable mounting means for controlling the speed of movement and the orientation in three-dimensions of the projection head of the at least one light emitter, and thereby for controlling the orientation in three-dimensions of each light signal emitted by one of said at least one light emitters.

Optionally, the projected shaped light is shaped, coloured and/or moved such that said one or more visible images on the surface external to the vehicle comprises any one or a combination of:
(i) a straight transverse line across the path ahead of the vehicle;
(ii) a straight transverse line across the path ahead of the vehicle, the width of which is similar or equal to the maximum width of the vehicle;
(iii) a straight transverse red line across the rear of the vehicle;
(iv) a straight longitudinal line along the path ahead of the vehicle;
(v) a straight longitudinal line along the path ahead of the vehicle positioned to illustrate a width required by a cyclist or a width required to overtake another vehicle;
(vi) a grid comprising a plurality of straight transverse lines across the path ahead of the vehicle and a plurality of straight longitudinal lines along the path ahead of the vehicle;
(vii) an arrow, chevron or triangle having a point or leading portion disposed on a notional longitudinal line ahead the vehicle;
(viii) a circle;
(ix) a spot;
(x) a pair of spaced and parallel straight transverse lines across the path ahead of the vehicle;
(xi) a pair of spaced and parallel straight longitudinal lines along the path ahead of the vehicle;
(xii) a pair of spaced and parallel straight longitudinal dashed lines along the path ahead of the vehicle aligned with the path of the wheels of the vehicle;
(xiii) a flashing triangle having a point or leading portion disposed on a notional longitudinal line behind the vehicle;
(xiv) an arrow, a flashing arrow, a series of arrows or a series of flashing arrows arranged to the side of the vehicle to indicate an intended change of direction of the vehicle or to the rear of the vehicle to indicate the presence of the vehicle.
(xv) a curved line; and
(xvi) a pair of spaced and parallel curved longitudinal lines along the path ahead of the vehicle.

Optionally, said one or more visible images comprises blue light, green light, amber light, yellow light and/or red light.

Optionally, the system is only manually activatable and the system is manually or automatically deactivateable.

Optionally, the system is configured to project a range of different visible images, wherein a currently projected visible image is a user selectable option and wherein said range of different visible images comprises at least one type of graphical referencing element for assisting a driver of the vehicle in gauging a distance relative to the vehicle; at least one warning reference for alerting another road user to a situation with the vehicle; and at least one communicating reference for conveying information regarding the intention of the driver of the vehicle to another road user.

The system may be configured to project a graphical referencing element for gauging a distance relative to the vehicle comprising: a primary pair of spaced and parallel straight longitudinal lines along the path ahead of the vehicle; a primary pair of spaced and parallel straight transverse lines across the path ahead of the vehicle; and a grid comprising a plurality of straight transverse lines across the path ahead of the vehicle and a plurality of straight longitudinal lines along the path ahead of the vehicle, which grid is disposed entirely within and spaced from a perimeter defined by said primary pairs of spaced and parallel straight longitudinal and transverse lines.

The system may be configured to project a graphical referencing element for gauging a distance relative to the vehicle comprising: a primary pair of spaced and parallel straight longitudinal lines along the path ahead of the vehicle; a single straight transverse line across the path ahead of the vehicle extending between and terminating on said straight longitudinal lines of the primary pair; and an arrow commencing on a medial point of said single straight transverse line and extending longitudinally therefrom and extending beyond the termination of the straight longitudinal lines of said primary pair such that the point of the arrow provides an indicator of the centremost point of a lane on a road.

The system may be configured to project a graphical referencing element for indicating the size of the vehicle, comprising a pair of spaced and parallel straight longitudinal lines along the path ahead of the vehicle, wherein the transverse position of each of said spaced and parallel straight lines is determined by said controller such that the pair is spaced by a distance that is no less than the maximum width of the vehicle.

Optionally, the system is configured to project a moving element for illustrating the intended path of the vehicle and/or for indicating the size of the vehicle, the moving element comprising two parallel, spaced-apart, arcuate lines, wherein the radius of curvature of the arcuate lines is determined in dependence upon the angle of the steering wheel and/or the angle of the road wheels that steer the vehicle.

The vehicle may further comprise a sensor for determining the position of another vehicle in front of the vehicle and the controller receives data relating to the speed of the vehicle.

Optionally, in dependence upon data from said sensor and in dependence upon the speed of the vehicle, the controller determines a position ahead of the vehicle to project a series of uniformly spaced visible images, wherein a distance between the spaced visible images is proportional to the vehicle speed and wherein the relative position of said series of spaced visible images is continually monitored and adjusted in dependence upon the data relating to the speed of the vehicle and data relating to the position of another vehicle.

Optionally, components of the graphical referencing element of one or more visible images are deselectable by a user of the system.

Optionally, the system further comprises one or more imaging means for gathering image data of the one or more visible images.

The vehicle may comprise at least one imaging means mounted to the vehicle and positioned and configured to collect one or more secondary images of said one or more visible images projected onto said surface external to the vehicle, and wherein the control unit may be configured to determine from said one or more secondary images collected by the at least one imaging means an estimation of the clarity or quality of the one or more visible images on said surface external to the vehicle and in dependence upon the estimation of the clarity or quality being below an acceptable level for a specified period, the system is configured to be automatically deactivated.

Optionally, the at least one imaging means comprises at least one camera positioned and aligned to collect secondary images of said one or more visible images.

Optionally, the controller is configured to receive fourth data from one or more sensors of the vehicle which detect the position of an object in close proximity to the vehicle and wherein the controller is configured in dependence upon said fourth data to automatically deactivate the system and/or to automatically temporarily suspend projection of visible light from at least one light emitter.

Optionally, said one or more sensors comprise one or more or a combination of: a parking distance control sensor (PDC), a radar sensor, and a camera.

According to another aspect of the disclosure for which protection is sought, there is provided a method of projecting a visible image externally of a vehicle, the method comprising:

(i) determining a position in three-dimensions of the vehicle; and
(ii) in dependence upon said determined position of the vehicle projecting a shaped visible light from the shaped light emitter onto a surface external to the vehicle, the projected shaped light thereby forming one or more visible images on a surface external to the vehicle.

Additionally, the method of projecting a visible image externally of a vehicle according to the preceding paragraph may further comprise: determining a position in three-dimensions of a projection head and/or beam shaper element of a shaped-light emitter mounted to the vehicle; and in dependence upon said determined positions of the vehicle and projection head or beam shaper element of the shaped-light emitter, projecting a shaped visible light from the shaped-light emitter and onto a surface external to the vehicle, the projected shaped light thereby forming one or more visible images on a surface external to the vehicle.

Optionally, the method further comprises: moving the projection head and/or beam shaper element of the shaped-light emitter and/or controlling the colour of the projected shaped visible light and/or computing an accurate positioning of the shaped-projected light in correspondence with the position of the road wheels of the vehicle such that the one or more visible images comprise: a moving element and/or a coloured element and/or a graphical referencing element suitable for communicating an intention of the driver of the vehicle and/or for assisting a driver of the vehicle in gauging a distance relative to the vehicle.

According to yet another aspect of the disclosure for which protection is sought, there is provided a system for emitting shaped light from a vehicle and for projecting the emitted shaped light onto a surface external to the vehicle, the system comprising: a controller, one or more light sources and at least one light emitter mountable to a vehicle, wherein the at least one light emitter comprises a projection head, a beam shaper element and comprises or is coupled to the one or more light sources, the at least one light emitter being structured and arranged to emit at least a first light signal directed toward said surface external to the vehicle, the controller being configured to receive first data relating to the orientation of the vehicle in three-dimensions; and being configured to receive second data relating to the orientation in three dimensions of the projection head and/or beam shaper element of the or each light emitter and in dependence upon said first data and said second data, the controller is configured to control the output of the or each light emitter such that the projected shaped light emitted by the system is appropriately positioned on said surface external to the vehicle and at an appropriate distance from the vehicle.

Optionally, the system is configured such that the projected shaped light forms one or more visible images on said surface external to the vehicle, which one or more visible images comprise: a moving element and/or a coloured element and/or a graphical referencing element, suitable for communicating an intention of the driver of the vehicle and/or for assisting a driver of the vehicle in gauging a distance relative to the vehicle.

According to an even further aspect of the disclosure for which protection is sought, there is provided a program for a controller for use in the vehicle of the relevant preceding paragraphs or in the system of the relevant preceding paragraphs, the program configured such that when running on the controller, the controller determines a position, in three-dimensions, of the vehicle; determines a position, in three-dimensions, of at least one shaped light emitter moveably mounted to the vehicle; and in dependence upon said determined positions of the vehicle and said at least one shaped light emitter, causes a system to project shaped visible light from the at least one shaped light emitter and onto a surface external to the vehicle such that the projected shaped light forms one or more visible images on a surface external to the vehicle.

Where reference is made to projecting an image onto a surface, it is envisaged that the visible image could be projected such that it is above the surface in a region external to the vehicle and as such "onto a surface" should not necessarily be interpreted as excluding above a surface. Such visible images are additionally not necessarily limited to being two-dimensional images, but images (at least perceived to be) in three-dimensions may also be projected by the systems of envisaged embodiments.

According to another aspect of the invention for which protection is sought, there is provided a vehicle comprising a system for emitting a visible warning externally of the vehicle in the region of an openable door of the vehicle, which visible warning is emitted in dependence upon the system determining that an openable door of the vehicle is about to be opened or has (just) been opened and which visible warning is projected onto a surface external to the vehicle in the region of the openable door of the vehicle, as or before the openable door of the vehicle is opened.

The system may be configured to emit shaped light and to project the emitted shaped light onto said surface external to the vehicle, in the region of an openable door of the vehicle, the projected shaped light may thereby form one or more visible warnings on said surface external to the vehicle in the region of an openable door of the vehicle, which one or more visible warnings comprises: a moving element and/or a coloured element and/or a graphical element, suitable for communicating information externally of the vehicle to another road user. In this way another user of the road or pavement such as a driver, cyclist, motorcyclist or pedestrian, may be alerted to the imminent opening of a vehicle door, and/or to the fact that an occupant of the vehicle is egressing the vehicle and will be about to enter into space just beyond the opened door. The other users of the road or pavement may then be more likely to avoid the space required not only by the door itself but also just beyond the door into which the occupant of the vehicle will step.

The system may be configured to emit shaped light in response to a manual activation by a user of the vehicle and/or in response to an automatic activation by a controller of the system. In other words, a user may press a door mounted button, the depression of which enables the system to confidently determine that an openable door is about to be opened. Manual activation may be advantageous in that the system may only be deployed when an occupant has decided to exit the vehicle and inappropriate deployment of the system may be avoided because the determination made by the system is a confident determination (unless the user changes their mind or activates the system erroneously). However, this requires the occupant to remember to manually activate the system which they may not do, or which they may find inconvenient. It is therefore considered further advantageous to provide a system that is automatically activated or which verifies a manually triggered activation before permitting a visible warning to be projected.

For an automatically activated system, it is a further optional feature that the controller of the system is configured to receive one or more trigger data signals from one or more trigger sensors disposed on the vehicle, and the controller may determine that an openable door of the vehicle is about to be opened or has been opened in dependence upon said one or more trigger data signals.

At least one of said one or more trigger sensors may be selected from the group comprising: a movement or pressure sensor associated with a seat of the vehicle, a sensor associated with a safety belt, a sensor associated with a buckle for a safety belt, a sensor associated with a door handle of an openable door, a sensor associated with a hinge of an openable door, a sensor associated with a lock of an openable door, a sensor associated with a security locking system for the doors of the vehicle, a sensor associated with the engine or speedometer, a sensor associated with the braking system of the vehicle, and/or a sensor associated with the starting mechanism of the vehicle.

The system may be configured to determine that an openable door is about to be opened upon receiving a trigger data signal from one trigger sensor capable of determining that the vehicle is stationary and upon receiving a trigger data signal from another trigger sensor indicative of movement of an occupant of the vehicle.

Optionally, the system comprises a controller and at least one light emitter mounted to the vehicle, wherein the at least one light emitter: comprises a projection head; comprises or is coupled to one or more light sources; comprises a beam shaper element; and is structured and arranged to emit at least a first light signal directed towards said surface external to the vehicle.

Optionally, the controller is configured to receive first position data relating to the orientation of the vehicle in three-dimensions; and is configured to control the output of the or each light emitter such that the projected shaped light emitted by the system is appropriately positioned and arranged on said surface external to the vehicle and at an appropriate distance from the vehicle.

Optionally, the controller is configured to receive first position data relating to the orientation of the vehicle in three-dimensions; and is configured to receive second position data relating to the orientation of the or each projection head and/or beam shaper element in three-dimensions and in dependence upon said first position data and said second position data, the controller is configured to compute or determine an appropriate orientation of the projection head and/or beam shaper element of the or each light emitter such that the projected shaped light emitted by the system is appropriately positioned and arranged on said surface external to the vehicle and at an appropriate distance from the vehicle.

The one or more visible warnings may comprise a visible warning projected to the side and/or rear of the vehicle and wherein a part of the visible warning that is disposed closest to the vehicle is spaced from the vehicle by a distance between about 0 m and about 1 m.

Optionally, the one or more light sources are coherent or incoherent light sources and comprise any one or more, or an array, or a combination of: a laser, a light emitting diode (an LED) and an incandescent light source.

Optionally, the at least one light emitter is coupled to the one or more light sources by one or more optical fibres and the one or more light sources comprises a plurality of light sources disposed together within a protective housing.

Optionally, the plurality of light sources are disposed together within a protective housing disposed within the boot (trunk) of the vehicle and wherein the plurality of light sources are coupled to a power source and to a cooling means for controlling the temperature of the plurality of light sources.

Optionally, each of the at least one light emitters is coupled to the plurality of light sources by one or more optical fibres and is coupled via a combining means and a switching means, wherein the controller is coupled to each light source of the plurality of light sources for activating and deactivating each light source and wherein the controller is coupled to the switching means for selecting a colour of light to be transmitted via the one or more optical fibres to each of the at least one light emitters.

The beam shaper element may comprise any one or a combination of: a transmissive LCD, a lens, a collimator, a diffuser, a mask, a gobo, a static slide, a scanning device, a rastering device and/or a vectoring device. Said scanning device, rastering device or vectoring device may comprise any one or more or a combination of: a mirror galvanometer scanner, a MEMS scanner, an acousto-optic modulator and a piezo-driven scanner.

The system may further comprise at least one moveable mounting means, each moveable mounting means for mounting to the vehicle a portion of an optical fibre and/or the beam shaper element and/or the projection head of one of said at least one light emitters, and wherein the moveable mounting means may be structured and arranged for moving the optical fibre and/or the beam shaper element and/or the projection head or one or more components of the beam shaper element to thereby provide said one or more visible warnings.

Optionally, the controller is coupled to each moveable mounting means for controlling the speed of movement and the orientation in three-dimensions of the projection head of the at least one light emitter and thereby for controlling the orientation in three-dimensions of each light signal emitted by one of said at least one light emitters.

Optionally, the controller is configured to receive fourth data from one or more sensors of the vehicle which detect the position of an object in close proximity to the vehicle and wherein the controller is configured in dependence upon said fourth data to automatically deactivate the system and/or to automatically temporarily suspend projection of visible light from at least one light emitter. Said one or more sensors may comprise one or more or a combination of: a parking distance control sensor (PDC), a radar sensor, and a camera.

The projected shaped light is shaped, coloured and/or moved such that said one or more visible warnings on the surface external to the vehicle comprises any one or a combination of:
(i) a straight transverse line;
(ii) a straight longitudinal line;
(iii) a grid comprising a plurality of straight transverse lines and a plurality of straight longitudinal lines;
(iv) a box;
(v) a box comprising a diagonal cross;
(vi) a diagonal cross;
(vii) a circle with a straight (lateral) line;
(viii) a circle;
(ix) a spot;
(x) a pair of spaced and parallel straight transverse lines;
(xi) a fanned array of straight lines;
(xii) a pair of spaced and parallel straight longitudinal lines; and
(xiii) a flashing triangle having a point or leading portion disposed on a notional transverse line to the side of the vehicle or disposed on a notional longitudinal line to the rear of the vehicle.

Optionally, the projected shaped light is shaped and/or moved such that said one or more visible warnings on the surface external to the vehicle delineates an area or boundary that is swept out by the openable door of the vehicle. Advantageously this allows persons external to the vehicle to readily understand that the area swept out by the door should be avoided and as such acts as a reservation of that area for the openable door.

Optionally said one or more visible warnings comprises amber light, yellow light and/or red light.

The system may be configured to project a range of different visible warnings, and a currently projected visible warning may be a user selectable option. For example, a user may be allowed to select between a cross, a circle with a lateral straight line (mimicking a no-entry road sign, the meaning of which is well known in certain jurisdictions) or a yellow box with hashing (the prohibition not to block the "yellow box" may also be well known); other options may be available.

Optionally, the system may comprise at least one imaging means mounted to the vehicle and positioned and configured to collect one or more secondary images of said one or more visible warnings projected onto said surface external to the vehicle, and wherein the controller is configured to determine from said one or more secondary images collected by the at least one imaging means an estimation of the clarity of the one or more visible warnings on said surface external to the vehicle and in dependence upon the estimation of the clarity being below an acceptable level for a specified period, the system is configured to be automatically deactivated. The at least one imaging means may comprise at least one camera positioned and aligned to collect secondary images of said one or more visible warnings.

According to a further aspect of the invention for which protection is sought, there is provided a method of communicating externally of a vehicle that an openable door of the vehicle is opening, or is about to open, the method comprising:
(i) determining that an openable door of the vehicle is about to be opened or has been opened; and
(ii) in dependence upon said determining, projecting a shaped visible light from a shaped light emitter onto a surface external to the vehicle in the region of an openable door of the vehicle, the projected shaped light thereby forming one or more visible warnings on a surface external to the vehicle.

Optionally, the method may further comprise determining a position in three-dimensions of the vehicle. The method may additionally include determining a position in three-dimensions of the shaped light emitter which is moveably mounted to the vehicle and/or of a beam shaper element disposed therein.

The method may further comprise: moving the shaped light emitter and/or controlling the colour of the projected shaped visible light and/or computing an accurate positioning of the shaped projected light such that the one or more visible warnings comprise: a moving element and/or a coloured element and/or a shaped warning element suitable for warning another user of the road that an openable door of the vehicle has or is being opened.

According to yet a further aspect of the invention for which protection is sought, there is provided a system for emitting a visible warning externally of a vehicle in the region of an openable door of the vehicle, the system comprising: a controller, one or more light sources and at least one light emitter mountable to a vehicle, wherein the at least one light emitter comprises a projection head, a beam shaper element, and comprises or is coupled to the one or more light sources, the at least one light emitter being configured to emit at least a first light signal directed towards said surface external to the vehicle in the region of an openable door, the controller being configured to receive first position data relating to the orientation of the vehicle in three-dimensions; being configured to receive second position data relating to the orientation in three-dimensions of shaped-light output by the or each light emitter; and being configured to determine that an openable door of a vehicle is open or is about to open, and in dependence upon the system determining that an openable door of the vehicle is about to be opened, or has been opened and in dependence upon said first position data and said second position data, the controller is configured to control the projection head and/or beam shaper element of the or each light emitter, and is configured to project shaped light onto said surface external to the vehicle and at an appropriate distance from the vehicle.

Where reference is made to determining that an openable door of a vehicle is open, it may be intended to mean that it has been determined that the openable door is just open and not yet fully open so that the system has sufficient time to generate and project a shaped warning externally of the vehicle, beneficially before the openable door is fully opened in order to provide a more timely and more useful warning.

The system may be configured such that the projected shaped light forms one or more visible warnings on said surface external to the vehicle, which one or more visible warnings comprises: a moving element and/or a coloured element and/or a graphical element, suitable for communicating to a person external to a vehicle that an openable door of the vehicle is opening or is about to open.

Where reference is made to projecting an image onto a surface, it is envisaged that the visible warning could be projected such that it is above the surface in a region external to the openable door and as such "onto a surface" should not necessarily be interpreted as excluding above a surface. Such visible warnings are additionally not necessarily limited to being two-dimensional images, but images (at least perceived to be) in three-dimensions may also be projected by the systems of envisaged embodiments.

According to an even further aspect of the invention for which protection is sought, there is provided a program for a controller for use in the vehicle of any of the relevant preceding paragraphs or in the system of any of the relevant preceding paragraphs, the program configured such that when running on the controller, the controller determines a position, in three-dimensions, of the vehicle; determines a position, in three-dimensions, of at least one shaped light emitter moveably mounted to the vehicle; determines that an openable door of the vehicle is about to be opened or has been opened, and in dependence thereupon causes a system to project shaped visible light from the at least one shaped light emitter onto a surface external to the vehicle such that the projected shaped light forms one or more visible warnings on a surface external to the vehicle.

Further details regarding the implementation of a system for emitting a visible warning externally of the vehicle in the region of an openable door of the vehicle can be found in UK patent application number GB1315614.6, the contents of which are incorporated herein by reference.

Within the scope of this application it is expressly intended that the various aspects, embodiments, examples and alternatives set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings, in which:

FIG. 14 is a plan view from above of a vehicle having a system for emitting shaped light according to an embodiment of the disclosure wherein one or more moving visible images are shown being projected to the rear of the vehicle to provide an alert or hazard warning to communicate to other road users that the vehicle is stationary and that other vehicles should keep to the side of the vehicle.

DETAILED DESCRIPTION OF EMBODIMENTS

Detailed descriptions of specific embodiments of vehicles, systems, methods and programs of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that vehicles, systems, methods and programs described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
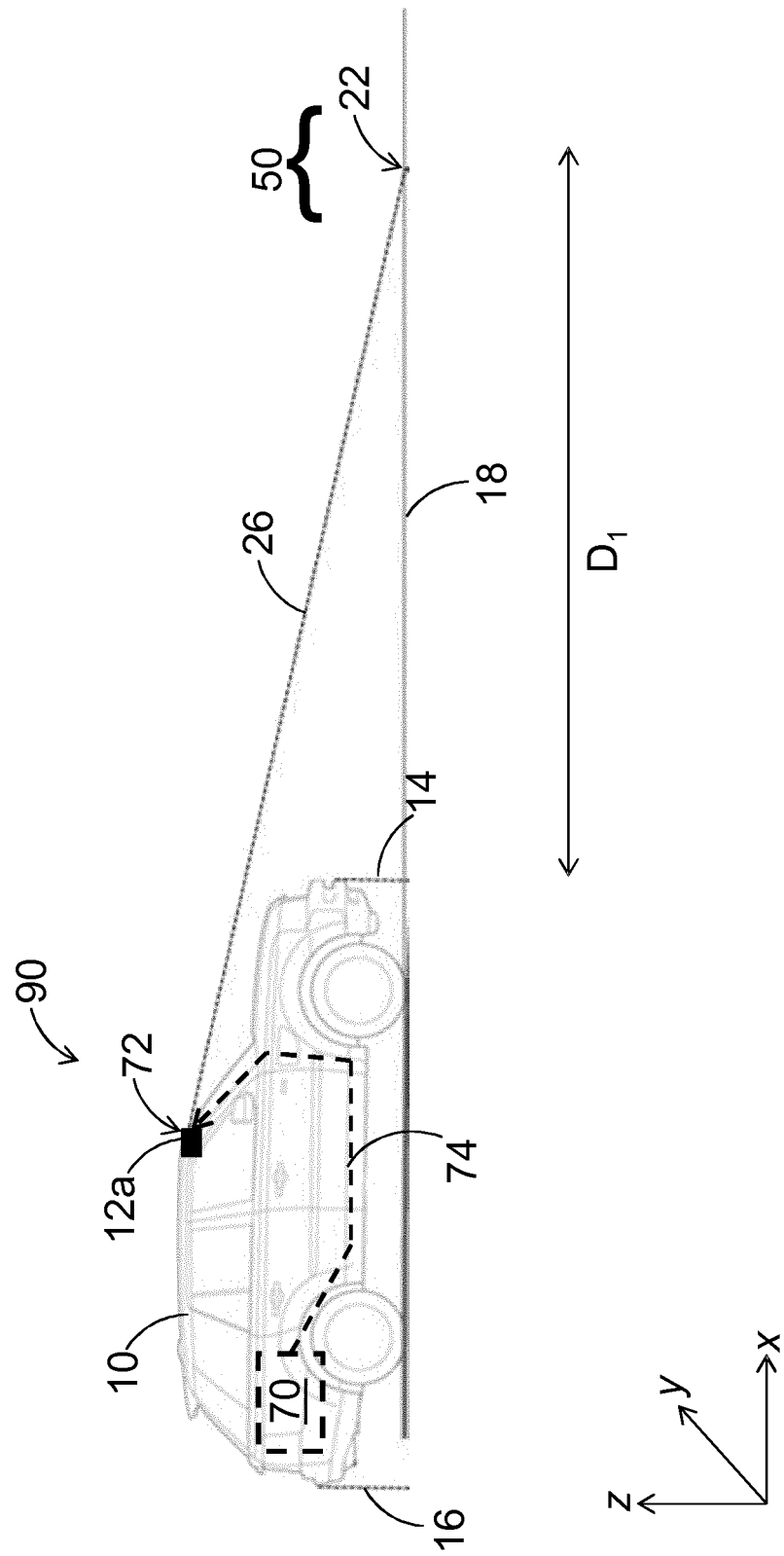
FIG. 1 is a schematic illustration of a side elevation of a vehicle comprising a system for emitting shaped light from the vehicle and for projecting the emitted shaped light onto a surface external to the vehicle according to an embodiment of the disclosure.

FIG. 1 shows a side elevation of a vehicle 10 comprising a system 90 for emitting shaped light 26 from the vehicle 10 and for projecting the emitted shaped light 26 onto a surface 18 that is external to the vehicle 10. In FIG. 1 the surface external to the vehicle 10 is a road; in other envisaged embodiments, the surface external to the vehicle 10 may include a pavement (side walk), a kerb, a hard-shoulder, a wall, a verge and other similar terrains and objects found around roadways. The shaped light 26 is projected into a viewing zone 50 whereat one or more visible images 22 are formed on the external surface 18.

Figure 2:
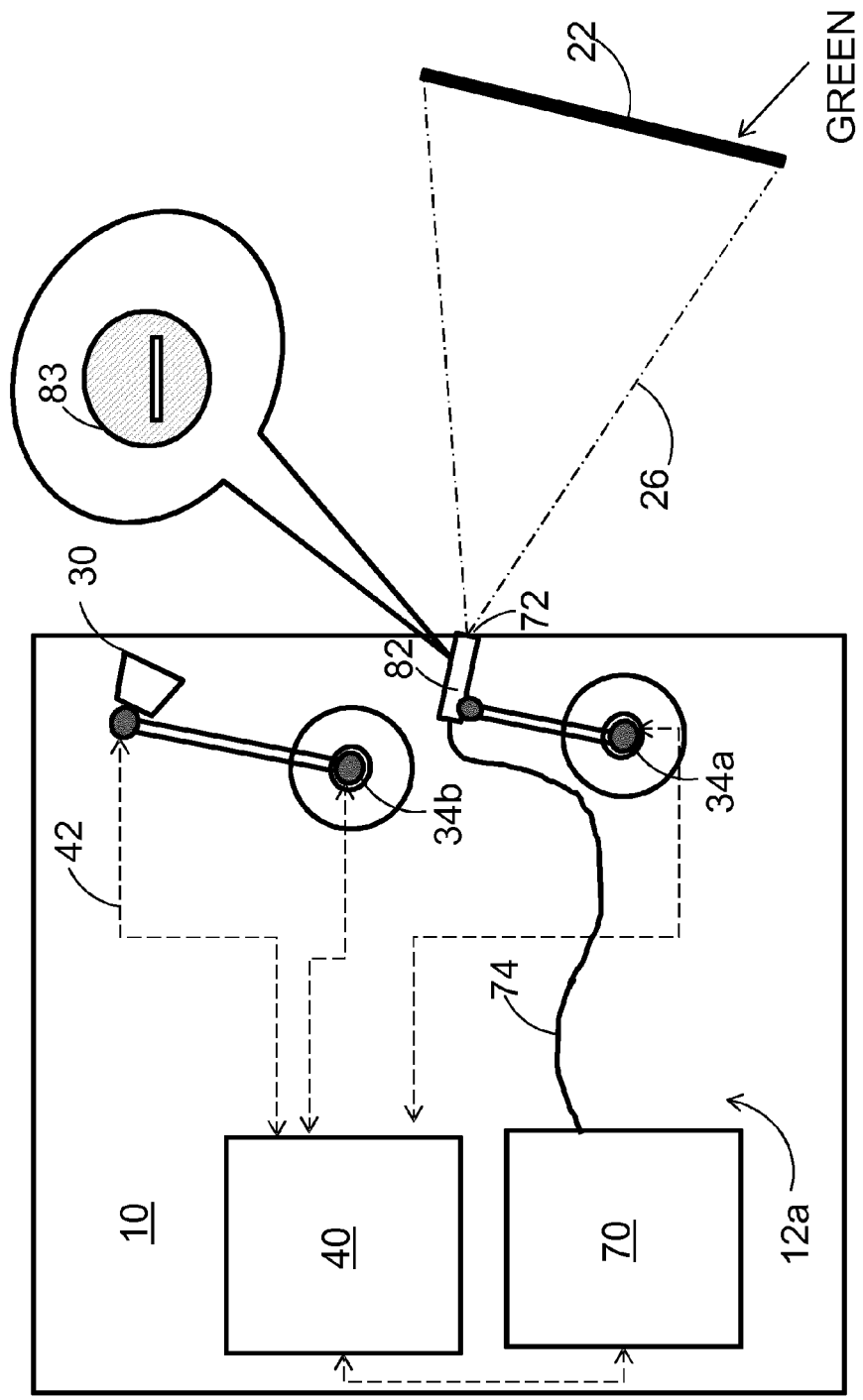
FIG. 2 is a schematic illustration of an apparatus comprised in the system of FIG. 1 according to an embodiment of the disclosure; the apparatus is shown as being at least partially disposed within the vehicle.

Referring now to FIG. 2 as well as FIG. 1, the illustrated system 90 comprises: a controller 40, one or more light sources 70 and at least one light emitter 12a mounted to the vehicle 10. The at least one light emitter 12a comprises, is coupled to, or is otherwise suitably associated with, a beam shaper element 82 and comprises or is coupled to the one or more light sources 70. The at least one light emitter 12a is coupled to the one or more light sources 70 via one or more or a network of optical fibres 74. The at least one light emitter 12a, in this illustrated embodiment, is a single light emitter 12a; the one or more light sources 70 is a single light source 70; and the light emitter is coupled to the light source 70 via a single optical fibre 74. The control unit 40 is coupled to the light source 70 by another communications link in order to control the operation and activation of the light source 70. A projection head 72 of the at least one light emitter 12a is arranged such that light emitted from the projection head 72 is directed externally of the vehicle 10. Advantageously the majority of the components of the system 90 are disposed internally of the vehicle 10 and are thereby protected from environmental conditions, for example rain, dirt, heat and impact.

The single light source 70, in this illustrated arrangement, optionally comprises a single laser operable at a wavelength of between about 515 nm and about 575 nm such that it emits visible green light. Optionally the laser 70 may be a solid state laser, for example a GaN laser emitting at a wavelength of about 515 nm to 520 nm or for example, a Nd:Yag laser emitting at a wavelength of about 532 nm to provide green visible light.

In the presently illustrated embodiment, the green-light emitting laser 70 is structured and arranged to transmit a coherent green light signal into the optical fibre 74. The optical fibre 74 is preferably packaged within the vehicle 10 such that it is protected and such that it discretely and efficiently transmits the green light signal from the light source 70 to the light emitter 12a, whereat the green light signal is shaped and projected toward the road surface 18 externally of the vehicle 10 using the beam shaper element 82. Optionally, the light emitter 12a additionally comprises a collimator for focussing the light from the optical fibre 74 into the beam shaper element 82. This may assist in producing a sharp visible image 22. In other envisaged embodiments the one or more light sources 70 may not be remotely placed relative to the at least one light emitter 12a, and the optical fibre 74 is therefore optional. Optionally, the optical fibre 74 may be housed within a protective sleeve or narrow trunking which may be threaded within the body of the vehicle 10 and optionally in part within the 'A'-pillar of the vehicle 10 such that the optical fibre 74 is predominantly occluded from view as it is networked between the light source 70 and the light emitter 12a.

The beam shaper element 82 comprises optical components configured and arranged such that a first shaped light signal 26 emitted by the light emitter 72 is a shaped beam 26 that is angled and optionally focussed downwardly towards the ground 18. The beam shaper element 82 may comprise any one or a combination of: a lens, a diffuser, a mask, a gobo (Go Before Optics i.e. a physical template for shaping the emitted light), a transmissive Liquid Crystal Display (LCD), a collimator, a static slide, a scanning device, a beam deflecting device, a rastering device and/or a vectoring device, in order to generate the emitted shaped light 22. In the present arrangement, the beam shaper element 82 optionally comprises a collimator (not shown) and a mask 83 (see FIG. 2) having a horizontal slit. The mask 83 is coupled to the projection head 72, such that when properly oriented, the projection head 72 emits a shaped green beam of light onto the road 18.

In FIG. 2, it can be seen that in the present embodiment, the system 90 also comprises a first mounting means 34a for the projection head 72 and/or for the beam shaper element 82 and/or for the one or more optical fibres 74. The first mounting means 34a is coupled to the controller 40 such that the orientation and angle of the projection head 72 is adjustable and controllable by the controller 40.

The projection head 72 of the light emitter 12a is preferably mounted at a location of at least 50 cm above the ground 18. Optionally, lower mounted projection heads 72 may nevertheless work, but the projection range in such an embodiment may be reduced or additional optical components may be required. Additionally, the system 90 of the disclosure is beneficial in that the driver of the vehicle 10 can see the externally projected visible images 22, which may be provided to guide and help the driver. Therefore there is a minimum distance ahead of the vehicle 10 in which projection of a visible image would be of no benefit to the driver, since it would be in a "dead-zone" $D_1$ and not actually visible to the driver. The "dead-zone" will vary at least in dependence upon the vehicle design, size and configuration, but in some embodiments the "dead-zone" may extend to a distance $D_1$ of about 6 m in front of the vehicle 10. It is preferred, but nevertheless optional therefore, to mount at least the projection head 72 of the light emitter at a suitable location on the vehicle 10 such that the shaped visible images can be projected on to the road or other external surface beyond the "dead-zone".

The controller 40 is configured to receive one or more first data signals relating to the orientation of the vehicle 10 in three-dimensions. The attitude of the vehicle 10 (in terms of roll, pitch and yaw) is typically known (optionally by using accelerometers and/or gyroscopes that may be present on the vehicle 10 as part of another vehicle system, for example an Inertial Measurement Unit (IMU)). Additionally, the controller 40 is configured to receive one or more second data signals relating to the orientation in three dimensions of the or each light emitter 12a (or a part thereof, for example the projection head 72 or beam shaper element 82). The first and second data signals may be wirelessly issued or may be issued via a wired link to the controller 40. First and second data signals (and other data signals) issued to the controller unit 40 and/or received by the control unit 40 are optionally routed via a vehicle Controller Area Network (CAN)-bus or similar vehicle-based data network. Alternatively, data may be transmitted to the controller 40 directly from an auxiliary controller, such as the IMU of the vehicle 10.

In dependence upon said first data signals and said second data signals, the controller 40 is configured to compute or determine an appropriate orientation required for the light emitter 12a or just the projection head 72 or the beam shaper element thereof. This is so that the projected shaped light beam 26 emitted by the system 90 is appropriately positioned and directed towards the road surface 18 external to the vehicle 10 and at an appropriate distance from the vehicle 10 such that a selected visible image 22 is properly formed and displayed externally of the vehicle 10.

The control unit 40 is thereby configured to account for or compensate for the changes in the attitude of the vehicle 10 in a computation or determination of the orientation of the projection head 72 that is required in order to ensure that a selected visible image 22 is properly formed and displayed externally of the vehicle 10. The visible image 22 may be projected at a specified distance ahead of the vehicle (for example, at least $D_1$ meters) and a trigonometric computation may be carried out by the controller to determine an appropriate position for the light emitter 12a and/or for the projection head 72 and/or for the beam shaper element 82.

The first optional mounting means 34a is optionally electronically adjustable. As such, even though the mounting height 'M' of the beam shaper element 72 can be changed, it is a known parameter. Similarly, even though an angle of incidence of the light beam 26 can be adjusted, it is a known parameter. The vehicle 10 of the present embodiment optionally comprises a suspension height adjustment system (also known as variable ride height). It will be recognised that the mounting height of the projection head 72 will change with adjustments in ride height and this is taken into consideration by the control unit 40 (which may receive a data signal relating to vehicle ride height via the vehicle CAN or directly from the suspension system controller) in collating second data relating to the current position of the light emitter 12a and in determining the required position of the light emitter 12a and in determining if an adjustment of the position of the light emitter 12a or a component thereof is necessary.

In the presently described and illustrated arrangement of FIGS. 1 and 2, the one or more visible images 22 is a single visible image 22 comprising a straight transverse line 22 extending across the path ahead of the vehicle 10. The straight transverse line 22 optionally is a single coloured green line of sufficient thickness such that it is clearly visible to a driver of a vehicle and/or to other users of the road. Optionally, the straight transverse line across the path ahead of the vehicle 10 has a width that is substantially similar or equal to the maximum width of the vehicle 10, such that the straight transverse line 22 across the path ahead of the vehicle 10 can be used by the driver in gauging whether the vehicle 10 can fit within the space available on the road 18 ahead of the vehicle 10. If the vehicle 10 is moving, the projected visible image 22 moves and the straight line 22 can be a very beneficial indicator that the vehicle 10 does or does not fit within a narrow gap, for example between cars parked on opposite sides of a road 18.

Optionally, the system 90 comprises an imaging means 30 (also referred to as an imager). The imaging means may take the form of a camera 30 and is configured to collect secondary images, in the appropriate spectral range for the one or more light sources 70, of the visible image 22 projected into the viewing zone 50. The control unit 40 is optionally wirelessly coupled via a communications link 42 to the camera 30. The control unit 40 is configured to receive data signals relating to the imagery obtained by the camera 30. The control unit 40 comprises a processing means (not shown) for processing the received signals. Optionally, the control unit 40 is configured to issue control signals to the camera 30, for example to activate the camera 30. Additionally, the control unit 40 is optionally coupled to a second mounting means 34b by which the camera 30 is mounted to the vehicle 10 by a further communications link in order to control the position of the camera 30. The control unit 40 comprises a processing means (not shown) comprising a recognition engine which carries out analysis of the one or more images or frames collected by the camera 30. The processing means is configured to determine whether the actual visible image 22 as projected onto the road 18 sufficiently closely represents the intended visible image that the system 90 was attempting to project.

Factors such as, but not limited to, bright ambient light, reflective surfaces, reflections, rain, heat, puddles, dirt or water on the road, dirt or water on the projection head and distortion of the light signal may cause the visible image 22 to be distorted, interrupted or incomplete, skewed and/or incorrectly positioned. A visible image 22 that is not represented sufficiently clearly may not only be of little benefit, but may in fact be of detriment since its presence may be distracting. Whereas a user may activate and deactivate the system 90 automatically, it is a further optional and beneficial feature of the disclosure, that upon determining that the visible image 22, as indicated by image data collected of the visible image 22, is not reproduced sufficiently closely to the intended image, that the system 90 can be automatically deactivated or temporarily suspended. In such a situation a human machine interface (not shown) disposed within the cabin of the vehicle 10 for enabling user control and user selection of customisable features, may issue an error message.

The second optional mounting means 34b is optionally electronically adjustable. As such the height and orientation of the camera 30 are known by the controller so that the perspective from which the visible image 22 is viewed can be taken into consideration in determining whether the secondary images of the visible image 22 are a sufficiently close match for the intended visible image.

In view of the user manually activating and deactivating the system 90, the use of a camera or other imaging means 30 for the purpose of monitoring the quality of the projected visible image, is entirely optional.

Referring now to FIGS. 3 to 14, there are shown additional embodiments of the system and of the visible images that may be projected by a system of the present disclosure. In the further illustrated embodiments, like numerals have, where possible, been used to denote like parts, albeit with the addition of the prefix "100", "200", "300" and so on to indicate that these features belong to the additional embodiments respectively. For conciseness of description, like features are not necessarily described in further detail.

Figure 3:
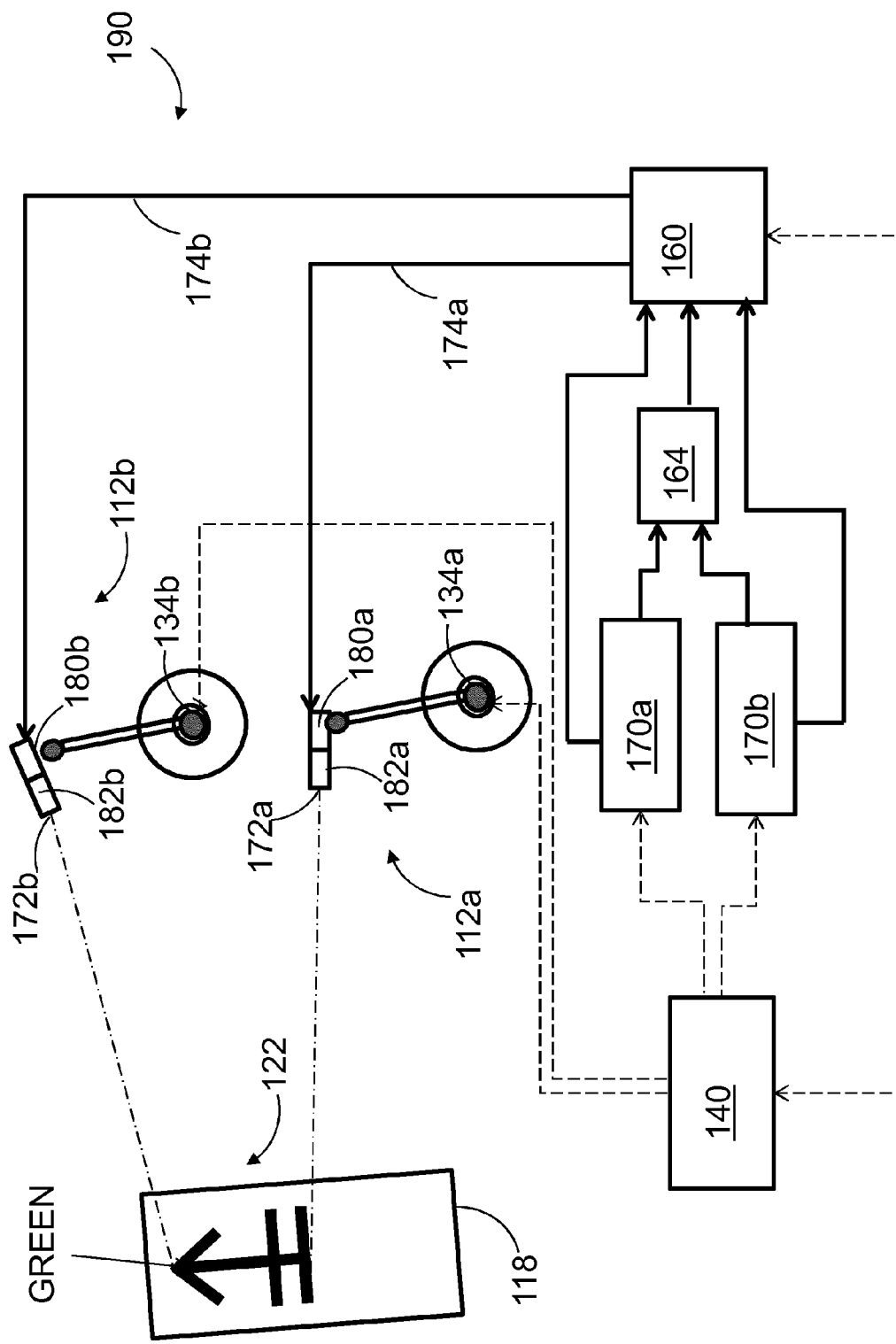
FIG. 3 is a schematic illustration of an apparatus for use in a system for emitting shaped light from a vehicle and for projecting the emitted shaped light onto a surface external to the vehicle according to an embodiment of the disclosure.

In FIG. 3 a schematic illustration is provided of a system 190 for projection of one or more visible images from a vehicle (not shown in FIG. 3). The system 190 differs from the system 90 of FIG. 2 in that no imaging means 30 is provided and a user manually deactivates the system 190 in the event that the projected visible image 122 is unsatisfactorily distorted. The system 190 further differs, in that the one or more light sources comprises two laser light sources 170a and 170b and in that the at least one light emitter comprises two light emitters 112a, 112b.

Optionally, a first laser light source 170a emits red light and a second laser light source 170b emits green light. The system 190 comprises a combiner 164 and a switching means 160. Red light emitted from the first laser light source 170a is output to both the combiner 164 and to the switching means 160. Similarly, green light emitted from the second laser light source 170b is output to both the combiner 164 and to the switching means 160. In this way, the system 190 can select from three different colours of light (red light, green light or a combination of red and green light which will be seen as an amber coloured light) and can emit two colours simultaneously. The three-way switching means 160 is coupled to the controller 140 which can thereby control the three-way switching means 160 to select which of the three available colours will be output by each of the light emitters 112a, 112b at any given time. As such, the three-way switching means has two outputs, each optionally comprising optical fibres 174a, 174b, one output to the first light emitter 112a and one output to the second light emitter 112b.

The light emitters 112a, 112b are each similar in structure to those of the first embodiment, each having an electrically controllable moveable mounting means 134a, 134b, each having a collimator 180a, 180b which outputs to the beam shaper element 182a, 182b.

Each electrically controllable moveable mounting means 134a, 134b is sufficiently moveable, adjustable and operable at sufficient speed that each light emitter 112a, 112b can raster, vector, scan or otherwise rapidly move the emitted coloured laser light to "draw" the projected visible image 122 onto the surface external to the vehicle 10. A section of road 118 is shown in FIG. 3 and the visible image shown therein is optionally a single coloured, green, graphical referencing element that comprises: a pair of spaced and parallel straight transverse lines across the path ahead of the vehicle of similar length and each having a length that matches the maximum width of the vehicle; and a single longitudinally extending, medially positioned straight line extending along the path ahead of and in front of the vehicle, which longitudinal line intersects one straight line of the pair of spaced and parallel straight transverse lines and which terminates on the other and which longitudinal line terminates, at its other end, in an arrow. The graphical referencing element 122 is beneficial to a user of the vehicle since it clearly illustrates the width of the vehicle (and therefore whether the vehicle can fit in the available space ahead); and provides a centre guide to assist the driver in following a central position within the space available. This is particularly advantageous where the vehicle is being driven in a narrow gap and the graphical referencing element that has been projected at a specified distance in front of the vehicle has been deliberately and specifically sized to provide an accurately scaled guide that is representative of the vehicle's maximum width. The controller 140 is provided with the maximum vehicle width and in typical envisaged embodiments, a degree of tolerance will be added to that width so that in the computation of the size of the light beam to emit from the vehicle in order to project a marker(s) that illustrates the vehicle's width a margin is included such that the projected visible image 122 does not project a width that is less than the width of the vehicle, thereby ensuring that the information conveyed to the driver will ensure safe passage of the vehicle.

It is envisaged that in this and/or in other embodiments, one or more or a series of wavelength appropriate mirror galvanometer scanners and/or or one or more or a series of piezo-driven scanners or beam deflectors and/or one or more a series of microelectromechanical (MEMS) scanners (e.g. silicon-based MEMS mirrors/arrays) and/or one or more or a series of acousto-optic spatial light modulators may be used to rapidly deflect, scan, raster, vector or otherwise steer and direct the (laser) light signal to form the visible image. Such mirror galvanometer scanners, MEMS scanners, acousto-optic modulators, or piezo-driven scanners may be utilised in addition to, comprised within, or optionally provided as an alternative to the electrically driven mounting means 134a, 134b. When the projected visible image is formed in this way, the light beam is scanned or deflected sufficiently rapidly that to the human eye, the complete image is visible. This use of such scanners is particularly advantageous in that they permit the projection of more complex graphic referencing elements that can comprise one or more colours and permits the use of flashing images. In envisaged embodiments, the visible warning may be three-dimensional.

Further envisaged arrangements and configurations of the one or more visible images are described further below with reference to FIGS. 4 to 14. The visible images shown therein may be suitable for communicating an intention of the driver of a vehicle and/or for assisting the driver of a vehicle in gauging a distance relative to the vehicle. As stated above like numerals have, where possible, been used to denote like parts, albeit with the addition of the prefix "200", "300", and so on to indicate that these features belong to the additional embodiments respectively. For conciseness of description, like features are not necessarily described in further detail.

The one or more visible images projected into the viewing zone 50 can take a wide variety of forms. In the present disclosure (see FIGS. 4 to 14) a range of types of visible images 22, 122, 222, 322, 422, 522, 622, 722, 822a-c, 922a-c, 1022a-c, 1122a-d are described and illustrated. It will be recognised that the system 90, 190 and systems of other embodiments disclosed herein are suitable for creating an extensive range and variety of visible images comprising a wide variety, number and configuration of components, symbols, graphics, images, indications and signs. Of particular benefit are the visible images 722, 822a-c, 1022a-c, 1122a-d that are shown in plan view in FIGS. 10, 11, 13 and 14. These visible images 722, 822a-c, 1022a-c, 1122a-d (described in further detail below), each comprise a moving element (for example a flashing image, an image moving progressively with or relative to the vehicle 610, 810, 1010, 1110 and an image moving progressively relative to another object or vehicle).

Of additional or alternative benefit are visible images 22, 122, 222, 322, 422, 522, 622, 722, 822a-c, 922a-c, 1022a-c, 1122a-d that comprise a coloured element. It will be recognised that the illustrations of FIGS. 4 to 14 are provided in greyscale for the purpose of compliance with patent regulations. However the one or more visible images 22, 122, 222, 322, 422, 522, 622, 722, 822a-c, 922a-c, 1022a-c, 1122a-d shown therein are coloured images, optionally comprising green light, yellow light, amber light, red light, orange light and other suitable colours of light, that are bright, easily seen, and assist in conveying a message. (For example red coloured light may be used to illustrate a hazard warning or alert). Legal restrictions in certain jurisdictions may prohibit the use of certain colours of light from being emitted from all or part of the vehicle. Indeed it is for this reason that none of the illustrated embodiments disclose the use of blue light. However, it will be realised that the systems disclosed herein are capable of emitting a range of colours of visible light that can be shaped in numerous ways for forming bright, noticeable, clear and useful visible images 22, 122, 222, 322, 422, 522, 622, 722, 822a-c, 922a-c, 1022a-c, 1122a-d externally of the vehicle 10.

Of further additional or alternative benefit are visible images 122, 222, 322, 422, 522, 622, 722, 822 and 922 (shown in plan view in FIGS. 3 to 12), comprising a graphical referencing element that can indicate to the driver of the vehicle 10 or another road user (including pedestrians and cyclists) a dimensional scale. Such a dimensional scale may contain and convey information relating to an absolute or relative distance, to speed and/or to time.

Figure 4:
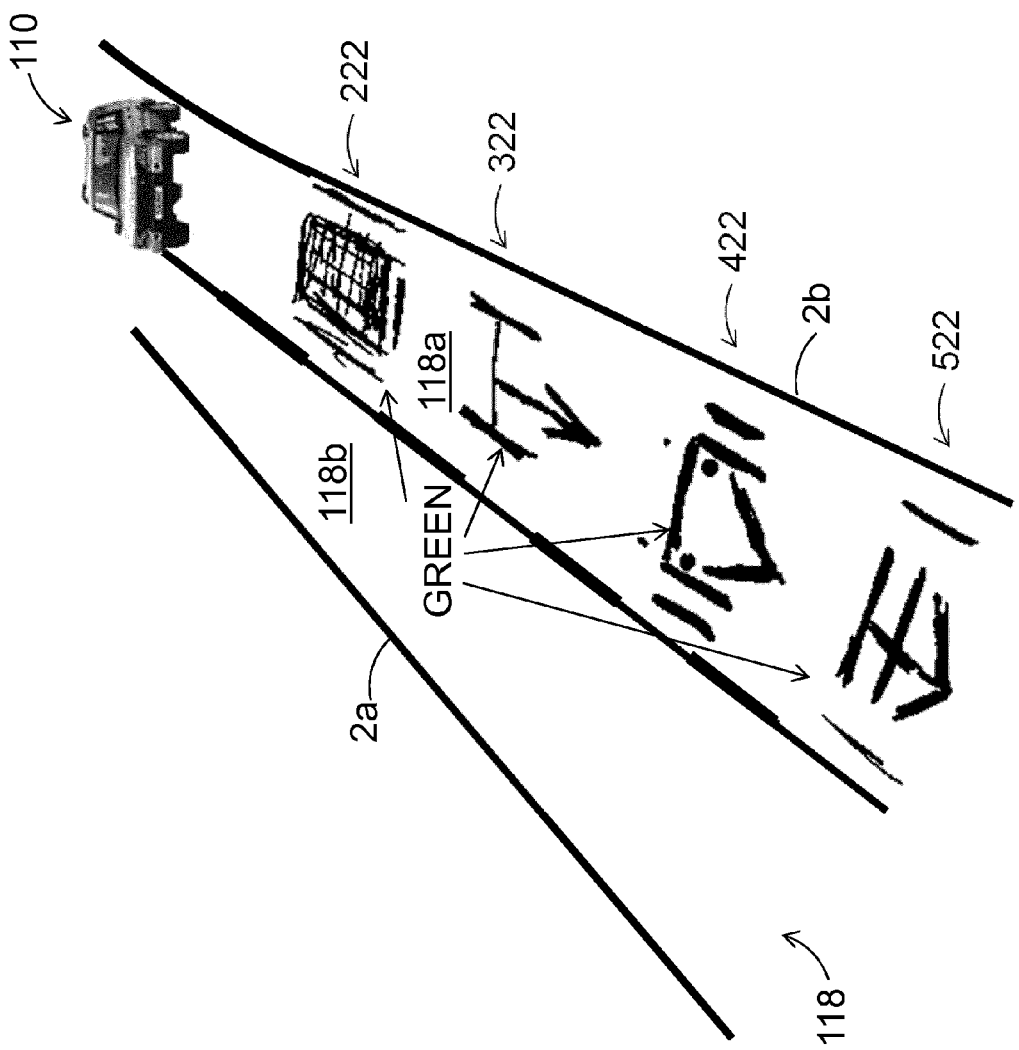
FIG. 4 is a perspective illustration from the front of a vehicle travelling along a road, the vehicle having a system for emitting shaped light from the vehicle, and the illustration shows exemplary and optional visible images according to embodiments of the disclosure.

In FIG. 4 there is shown, in perspective view, a number of different types of visible image 222, 322, 422, 522 that a vehicle comprising the system 190 is equipped to project onto a road 118. The road 118 comprises a left-hand lane 118a and a right hand lane 118b. The road 118 comprises a left edge or kerb 2b and a right edge or kerb 2a (as viewed from the driver's perspective). In FIGS. 5 to 8, these visible images 222, 322, 422, 522 are shown in larger view and in plan view so that the composition of the visible images 222, 322, 422, 522 can be more clearly seen.

Figure 5:
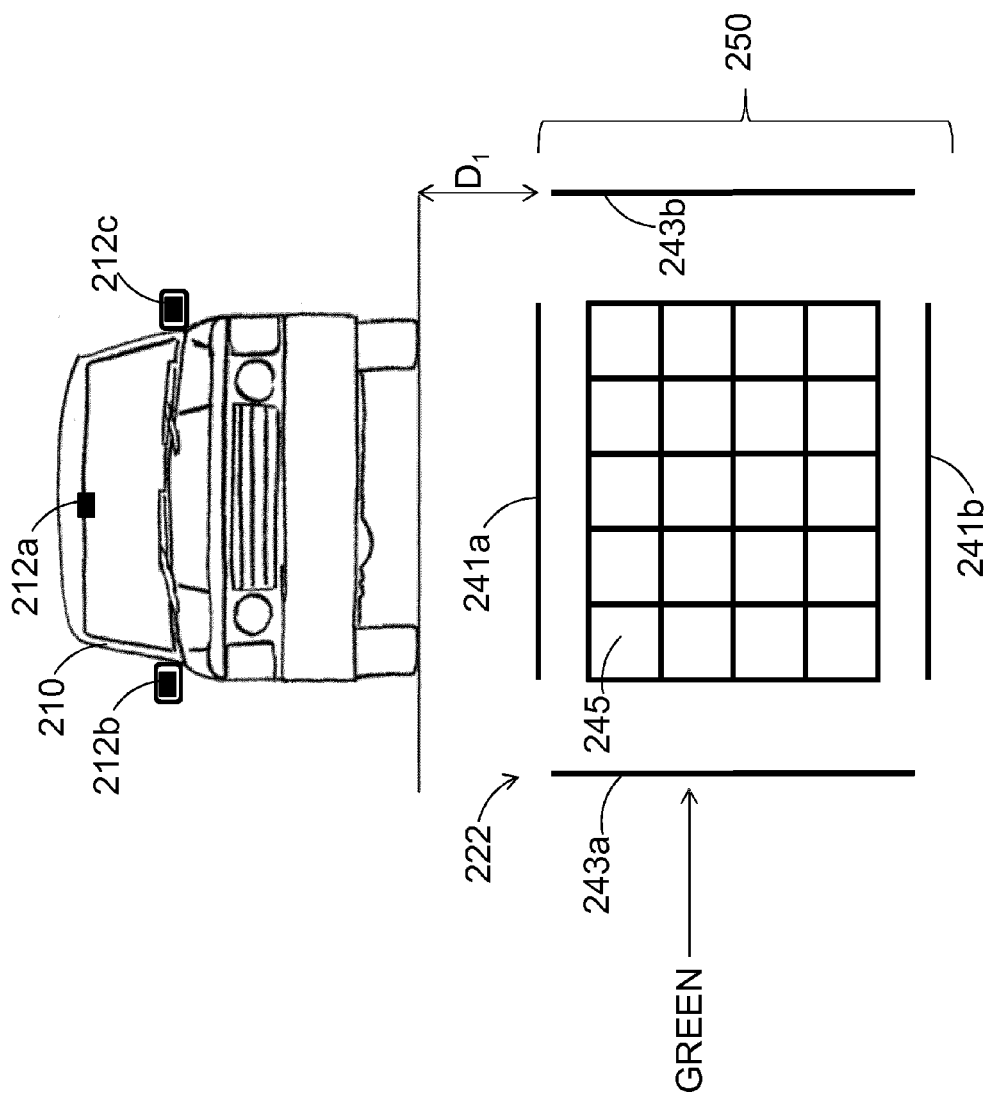
FIGS. 5 to 9 show a front view of a vehicle having a system for emitting shaped light and show a plan view of one or more exemplary and optional visible images that are being projected onto the road surface in front of the vehicle according to embodiments of the disclosure.

Referring in more detail to FIG. 5, there is shown a front view of a vehicle 210 having a system (not fully shown) optionally comprising at least three light emitters 212a, 212b, 212c disposed about the front of the vehicle 210. A visible image 222 is shown in plan view in order to present a clear indication of the composition of the visible image 222. The visible image 222 comprises a coloured element and a graphical referencing element. Optionally the coloured element comprises a single colour which is green. The graphical referencing element of the visible image 222 optionally comprises a pair of spaced, parallel, straight, transverse lines 241a, 241b disposed across the path ahead of the vehicle 210, each of which has a width that is substantially similar or equal to the maximum width of the vehicle 210, such that the straight transverse lines 241a, 241b across the path ahead of the vehicle 210 can be used by the driver in gauging whether the vehicle 210 can fit within the space available on the road ahead of the vehicle 210. The graphical referencing element of the visible image 222 optionally also comprises a pair of spaced and parallel straight longitudinal lines 243a, 243b along the path ahead of the vehicle. The longitudinal lines 243a, 243b are disposed on the left and right hand sides of the vehicle 210 (when viewed from the vehicle 210) and are provided to illustrate a further boundary line to assist the driver in judging the size of the available space in front of the vehicle 210. The graphical referencing element of the visible image 222 optionally also comprises a grid 245 comprising a plurality of straight transverse lines across the path ahead of the vehicle and a plurality of straight longitudinal lines along the path ahead of the vehicle. The grid 245 again assists the driver in judging the width of path ahead of the vehicle relative to the width of the vehicle. For example, if the road narrows significantly such that any part of the grid 245 is projected onto an object other than a road surface upon which the vehicle 210 can travel, such as, but not limited to another vehicle, a kerb, a bin and a wall, the driver of the vehicle 210 will know that the vehicle 210 does not fit in the space available ahead of the vehicle 210 and can select another route and avoid causing damage to the vehicle 210 or other object.

Figure 6:
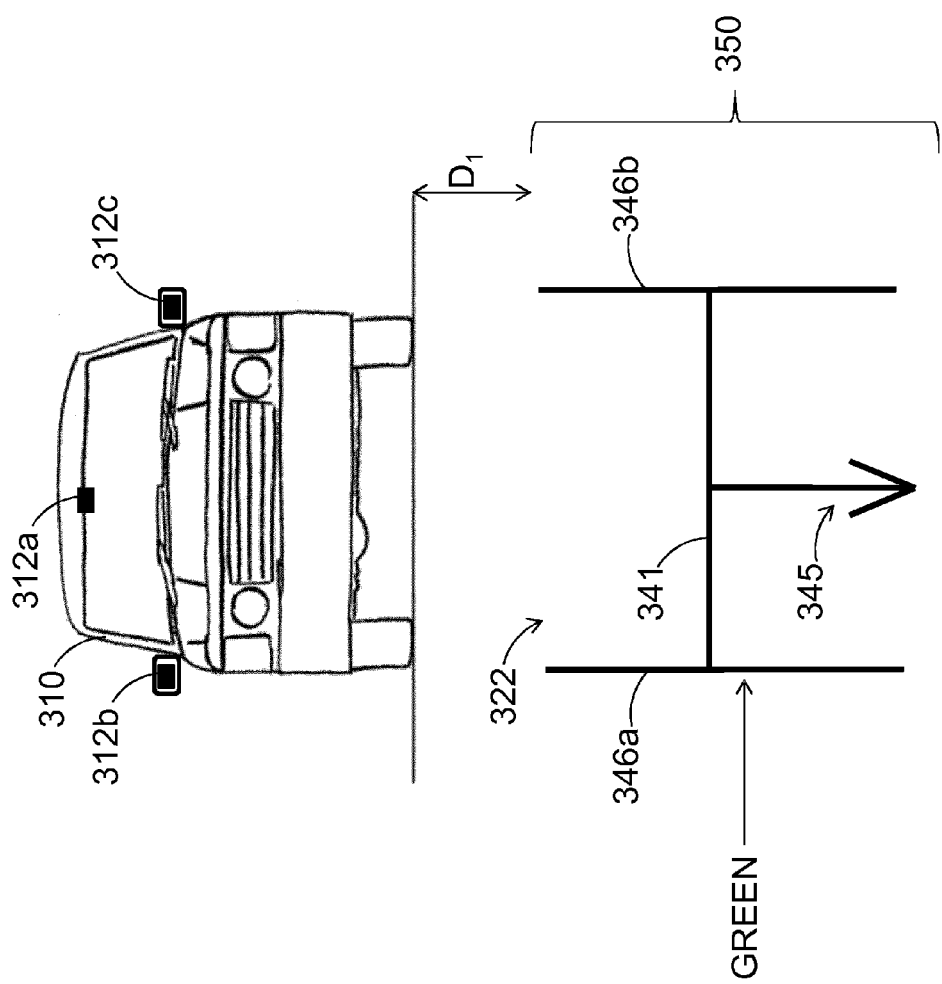

Referring in more detail to FIG. 6, there is shown a front view of a vehicle 310 having a system (not fully shown) optionally comprising at least three light emitters 312a, 312b, 312c disposed about the front of the vehicle 310. A visible image 322 is shown in plan view in order to present a clear indication of the composition of the visible image 322. The visible image 322 comprises a coloured element and a graphical referencing element. Optionally the coloured element comprises a single colour which is optionally green. The graphical referencing element of the visible image 322 optionally comprises a pair of spaced and parallel straight longitudinal lines 346a, 346b along the path ahead of the vehicle. The longitudinal lines 346a, 346b are disposed at a distance matching the right-hand and left-hand sides of the vehicle 310 respectively (when viewed from the vehicle 310) and are provided to illustrate the width of the vehicle 310. The graphical referencing element of the visible image 322 optionally further comprises a straight transverse line 341 that is disposed across the path ahead of the vehicle 310 and which has a width that is substantially similar or equal to the maximum width of the vehicle 310. As such, the straight transverse line 341 terminates at each of its ends on one of the longitudinal lines 346a, 346b. An arrow 345 comprising a further longitudinal line that extends from a medial or central point on the transverse line 341 and terminates in a head having an apex optionally in-line with a far termination of each longitudinal line 346a, 346b is also projected onto the path ahead of the vehicle 310. The visible image 322 can be used by the driver in gauging whether the vehicle 310 can fit within the space available on the road ahead of the vehicle 310. The graphical referencing element of the visible image 322 again assists the driver in judging the width of the path ahead of the vehicle 310 relative to the width of the vehicle 310, such that if the road narrows significantly, or is obstructed in some way, if any part of the visible image 322 is projected onto an object other than a road surface upon which the vehicle 310 can travel such as, but not limited to, another vehicle, a kerb, a bin and a wall, the driver of the vehicle 310 will know that the vehicle 310 does not fit in the space available ahead of the vehicle 310 and can select another route and avoid causing damage to the vehicle 310 or to the other object.

Figure 7:
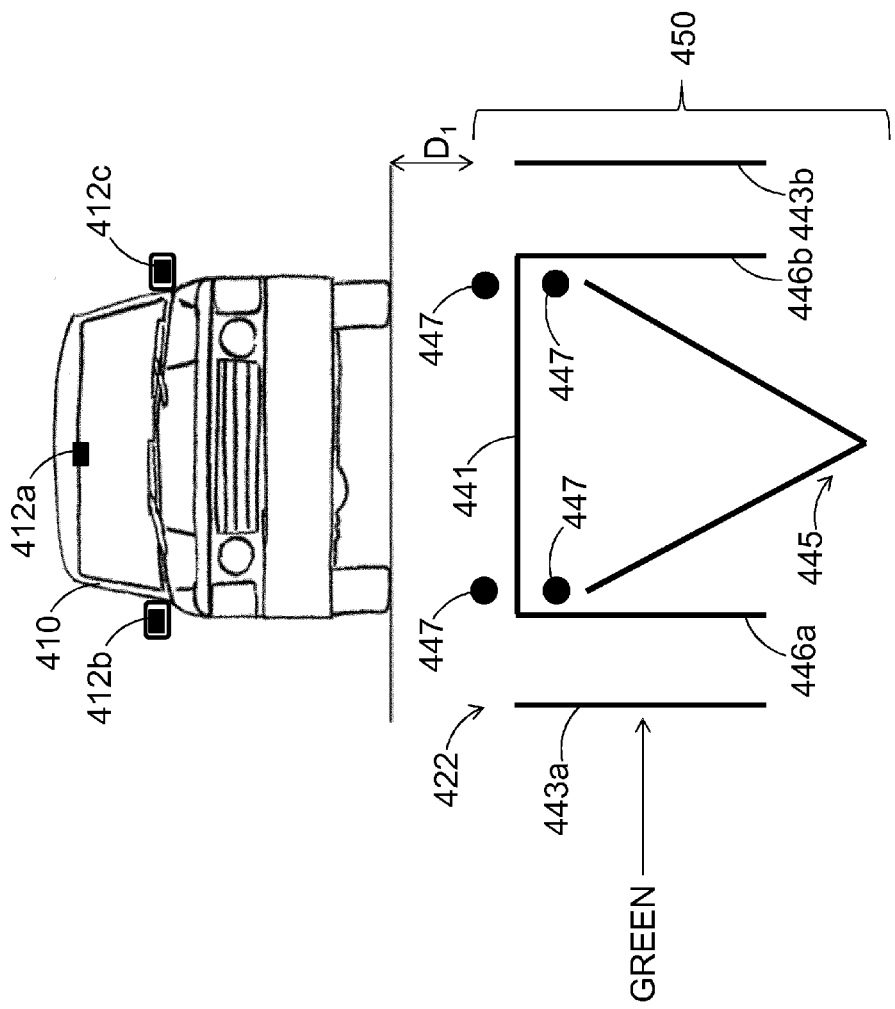

Referring in more detail to FIG. 7, there is shown a front view of a vehicle 410 having a system (not fully shown) optionally comprising at least three light emitters 412a, 412b, 412c disposed about the front of the vehicle 410. A visible image 422 is shown in plan view in order to present a clear indication of the composition of the visible image 422. The visible image 422 comprises a coloured element and a graphical referencing element. Optionally the coloured element comprises a single colour which is optionally green. The graphical referencing element of the visible image 422 optionally comprises two pairs of spaced and parallel straight longitudinal lines along the path ahead of the vehicle. A first (inner) pair of longitudinal lines 446a, 446b is aligned with the right-hand and left-hand sides of the vehicle 410 and as such illustrate the width of the vehicle 410. A second (outer) pair of longitudinal lines 443a, 443b illustrates an outer boundary to indicate to the driver regions where overtaking vehicles and/or cyclists may be present. A straight transverse line 441 across path of the vehicle 410, having a width substantially matching or exceeding the maximum width of the vehicle 410, adjoins the inner longitudinal lines 446a, 446b. A chevron 445 is disposed between the first (inner) pair of longitudinal lines 446a, 446b and its point is disposed on or at least proximate to a notional centre line extending along a longitudinal axis of the vehicle 410. Further optionally four solid circular spots 447 are provided—two within the first (inner) pair of longitudinal lines 446a, 446b and two on the opposite side of the transverse line 441.

Figure 8:
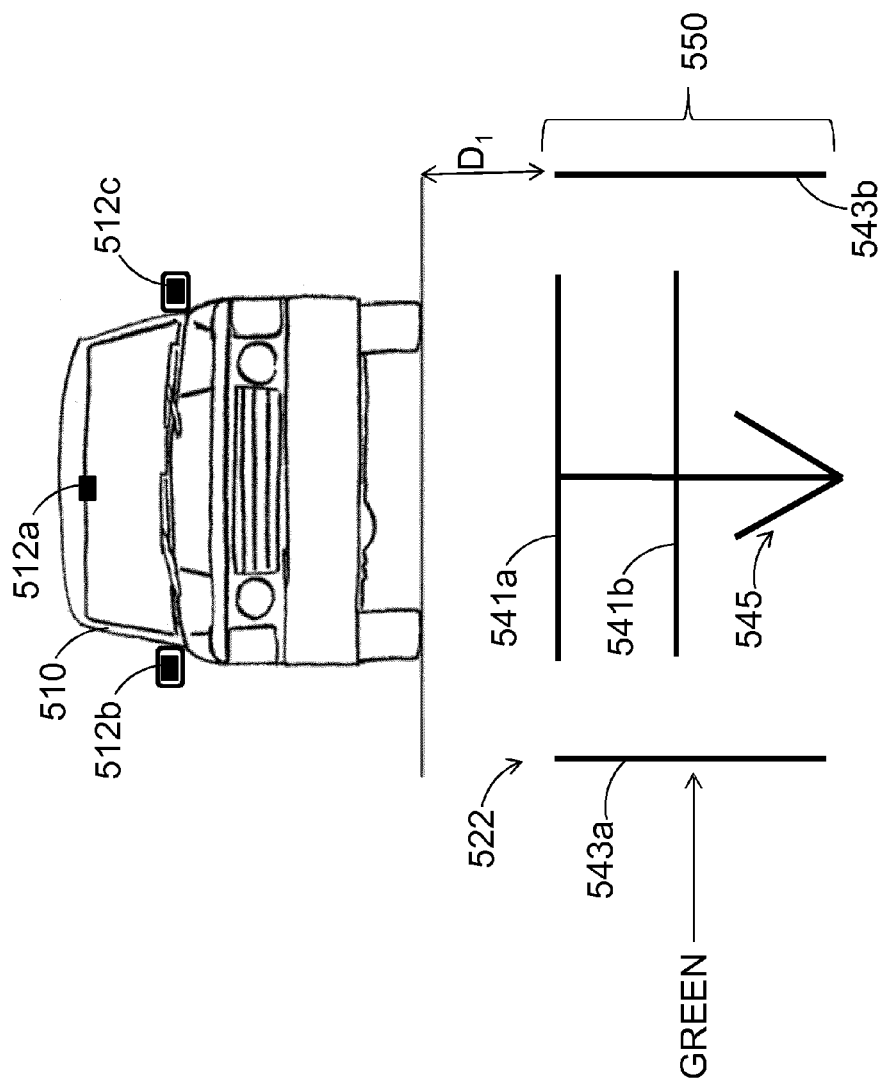

Referring in more detail to FIG. 8, there is shown a front view of a vehicle 510 having a system (not fully shown) optionally comprising at least three light emitters 512a, 512b, 512c disposed about the front of the vehicle 510. A visible image 522 is shown in plan view in order to present a clear indication of the composition of the visible image 522. The visible image 522 comprises a coloured element and a graphical referencing element. Optionally the coloured element comprises a single colour which is optionally green. The graphical referencing element of the visible image 522 optionally comprises a pair of spaced and parallel straight longitudinal lines 543a, 543b along the path ahead of the vehicle. The pair of longitudinal lines 543a, 543b illustrates an outer boundary to indicate to the driver regions where overtaking vehicles and/or cyclists may be present. A pair of straight parallel and spaced transverse lines 541a, 541b is projected across path of the vehicle 510, each having a width substantially matching or slightly exceeding the maximum width of the vehicle 510. An arrow 545 comprising a longitudinal line and a head is disposed between the outer pair of longitudinal lines 543a, 543b and its point is disposed on or at least proximate to a notional centre line extending along a central longitudinal axis of the vehicle 510.

Figure 9:
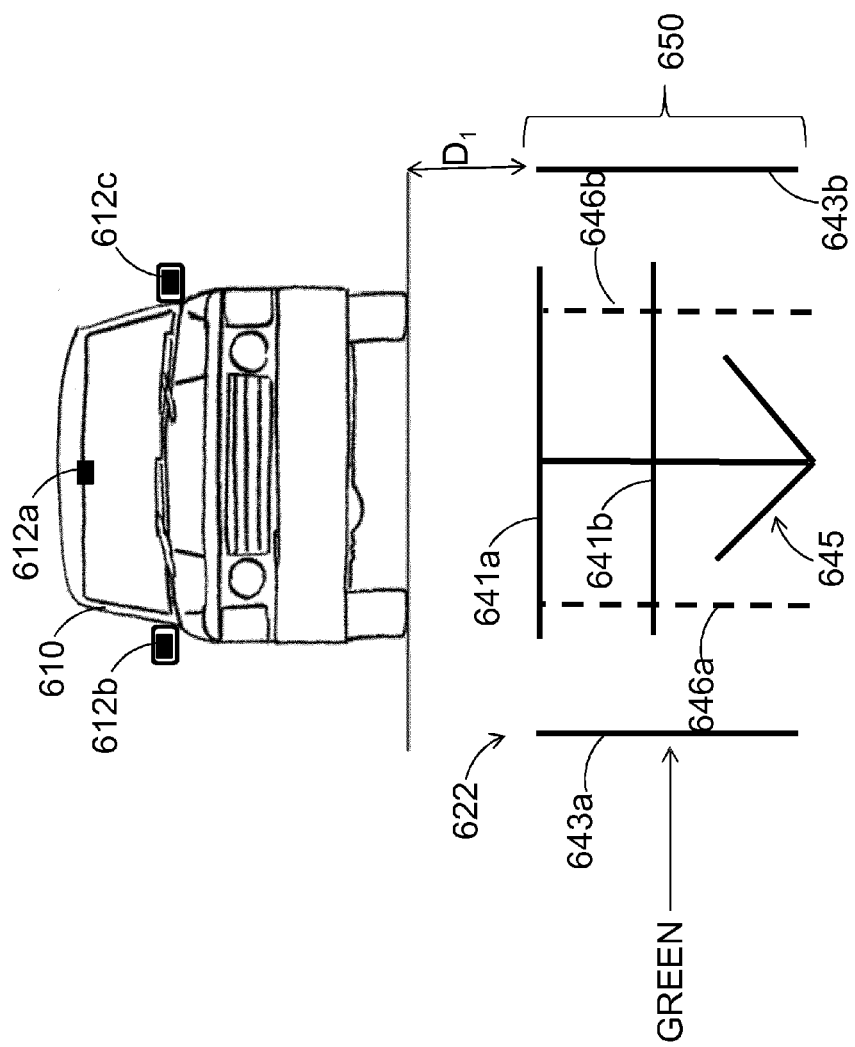

Referring in more detail to FIG. 9, there is shown a front view of a vehicle 610 having a system (not fully shown). A visible image 622 is shown in plan view in order to present a clear indication of the composition of the visible image 622. The visible image 622 differs from the visible image 522 of the embodiment illustrated in FIG. 8 by the addition of a pair of dashed lines 646a, 646b. Each of the dashed lines 646a, 646b is disposed along a notional longitudinal axis of the road wheels of the vehicle 610. This illustrates to the driver the current vehicle track. The vehicle track may be defined as the distance from the centre plane of one wheel to the centre plane of its opposing wheel and the lines 646a, 646b projected ahead of the vehicle 610 and parallel with a central longitudinal axis of the vehicle 610 may be projected irrespective of the instantaneous steering angle of the vehicle 610.

Figure 10:
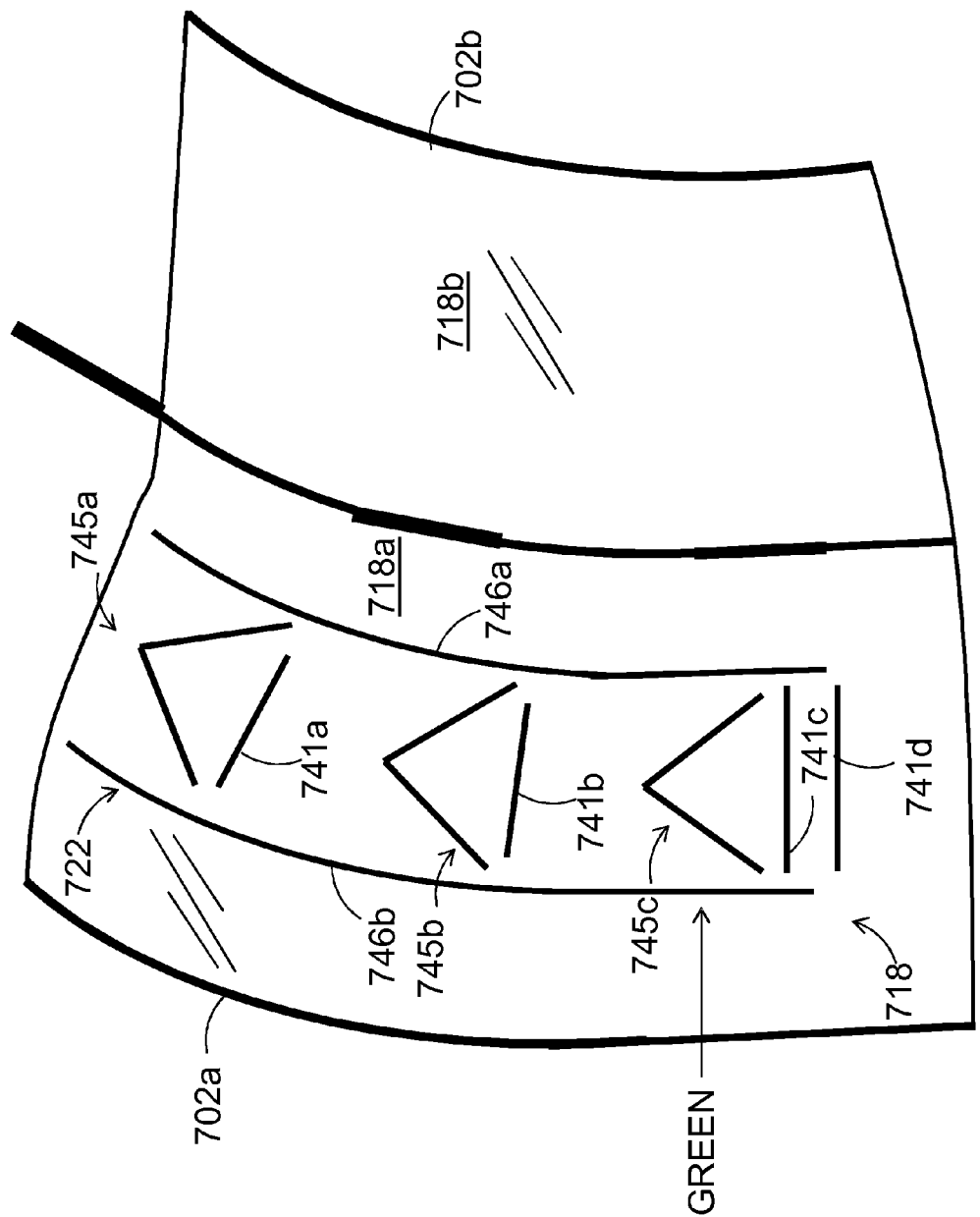
FIG. 10 is a plan view from above of a section of a road, showing one or more moving visible images according to an embodiment of the disclosure; the one or more visible images shown are projected onto the left lane of the road. The visible images comprise arcuate components that are radiused in dependence of the steering angle of the vehicle.

Referring in more detail to FIG. 10, there is shown a visible image 722, in plan view. The visible image 722 comprises a pair of spaced and parallel curved longitudinal lines along the path ahead of a vehicle (not shown). A radius of curvature of the longitudinal lines is computed, in real time, and in dependence upon the angle of the steering wheel and/or the angle of the road wheels. The angle of the steering wheel and/or the angle of the road wheels is monitored (optionally by the controller of the system receiving a data signal via the vehicle CAN from the electronic power assisted steering controller unit) and used in real time to adjust the position of the beam deflector or scanner used to project the visible image. Beneficially, the use of more than two light emitters means that one light emitter can be dedicated to the projection of the left-hand arcuate line 746b and another light emitter can be dedicated to the projection of the right-hand arcuate line 746a. The arcuate lines 746a, 746b are optionally projected such that their locations accurately predict the intended path of the vehicle, which may be moving, in real time. As such, the spaced parallel arcuate lines 746a, 746b may be spaced by a distance that is equal to or slightly greater than the maximum width of the vehicle. Optional additional components are provided in the visible image 722, including a series of longitudinally spaced chevrons 745a, 745b, 745c and spaced, substantially transverse lines 741a, 741b, 741c and 741d. The chevrons 745a, 745b, 745c may be uniformly spaced and spaced by a distance that is computed (or looked-up) by the controller in dependence upon the speed of the vehicle from which the visible image 722 is projected.

Figure 11:
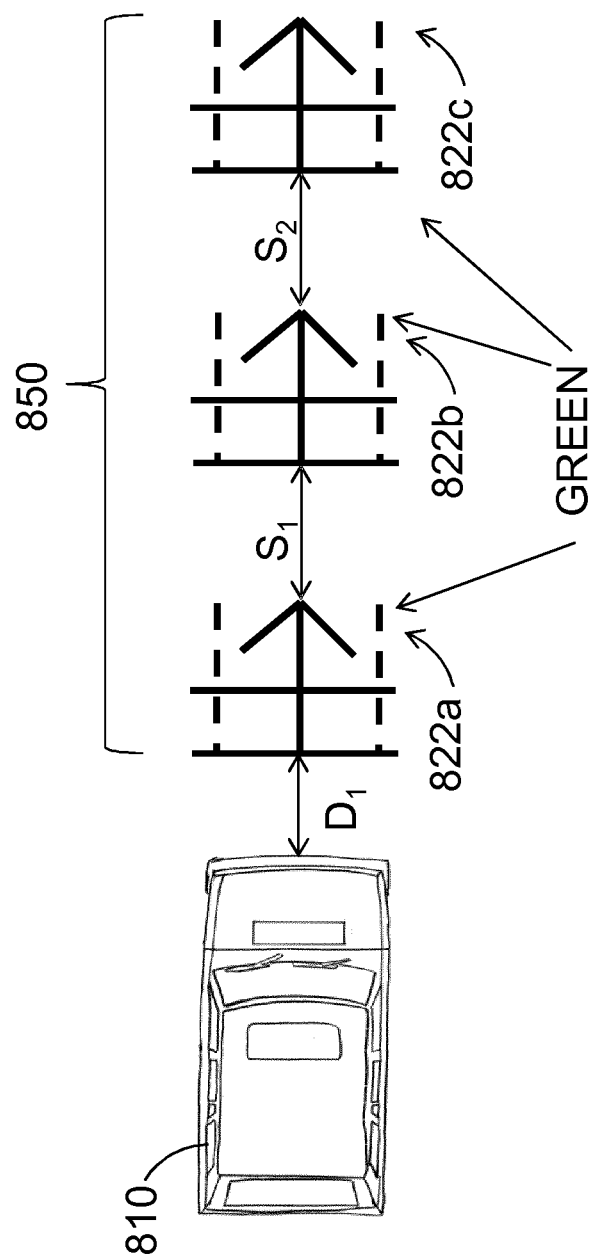
FIG. 11 is a plan view from above of a section of a road, showing a series of moving visible images according to an embodiment of the disclosure that are projected ahead of the vehicle with a fixed spacing between the visible images of the series.

Similarly, in FIG. 11, there is shown a series of visible images 822a, 822b, 822c which are spaced apart by distances $S_1$ and $S_2$. Preferably, but nevertheless optionally, the distances $S_1$ and $S_2$ are uniform and may be computed (or referenced) by the controller in dependence upon the speed of the vehicle. Alternatively, the spacing $S_1$, $S_2$ may be a user selectable option. The visible images 822a, 822b, 822c are similar in composition to the visible image 622 described above in relation to FIG. 9, albeit the outer longitudinal lines 643a, 643b have been omitted. In this way a series of artificial chevrons are projected ahead of the vehicle. In envisaged embodiments a sensor may be provided to detect the presence of a leading vehicle and the spacing of the chevrons may be selected or determined or computed in dependence upon the distance between the vehicle and the leading vehicle. Optionally, each visible image 822a, 822b, 822c may comprise only a chevron. The active sensor for detecting the presence and/or relative position of a leading vehicle may comprise a radar sensor.

Figure 12:
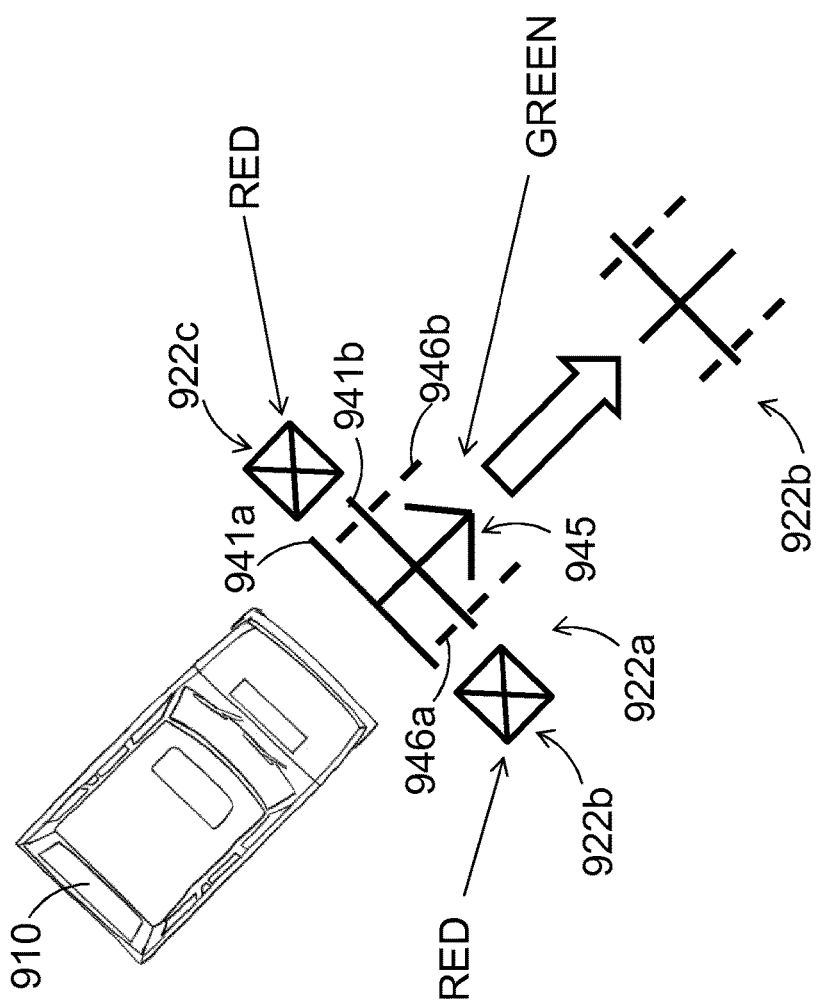
FIG. 12 is a plan view from above of a vehicle having a system for emitting shaped light according to an embodiment of the disclosure, wherein one or more visible images that have been projected onto a road are shown as having been customised by a user of the vehicle, optionally such that fewer components of the one or more visible images are projected ahead of the vehicle.

In a further illustrated arrangement of FIG. 12, the system (not shown) is configured to permit a user of the system a degree of control and in such an arrangement, certain components of the visible image may be de-selectable. In this way, the projected visible image is customisable, at least to some extent. In FIG. 12 it can be seen that the system is configured to emit an arrangement of three visible images 922a, 922b, 922c, optionally including a visible image 922b and 922c on either side of the vehicle path and each comprising a red coloured, squarish box comprising a diagonal cross. A centrally disposed visible image, in green, is the same as in FIG. 11. However, in this illustrated arrangement, a user can customise the visible images, optionally by de-selecting certain components such that they are not displayed. An arrow in FIG. 12 illustrates the visible image 922b remaining after user customisation. The projected visible image 922b no longer comprises the red coloured, squarish boxes comprising the diagonal crosses (922c, 922b) nor does it comprise the arrow head or near-transverse straight line.

Figure 13:
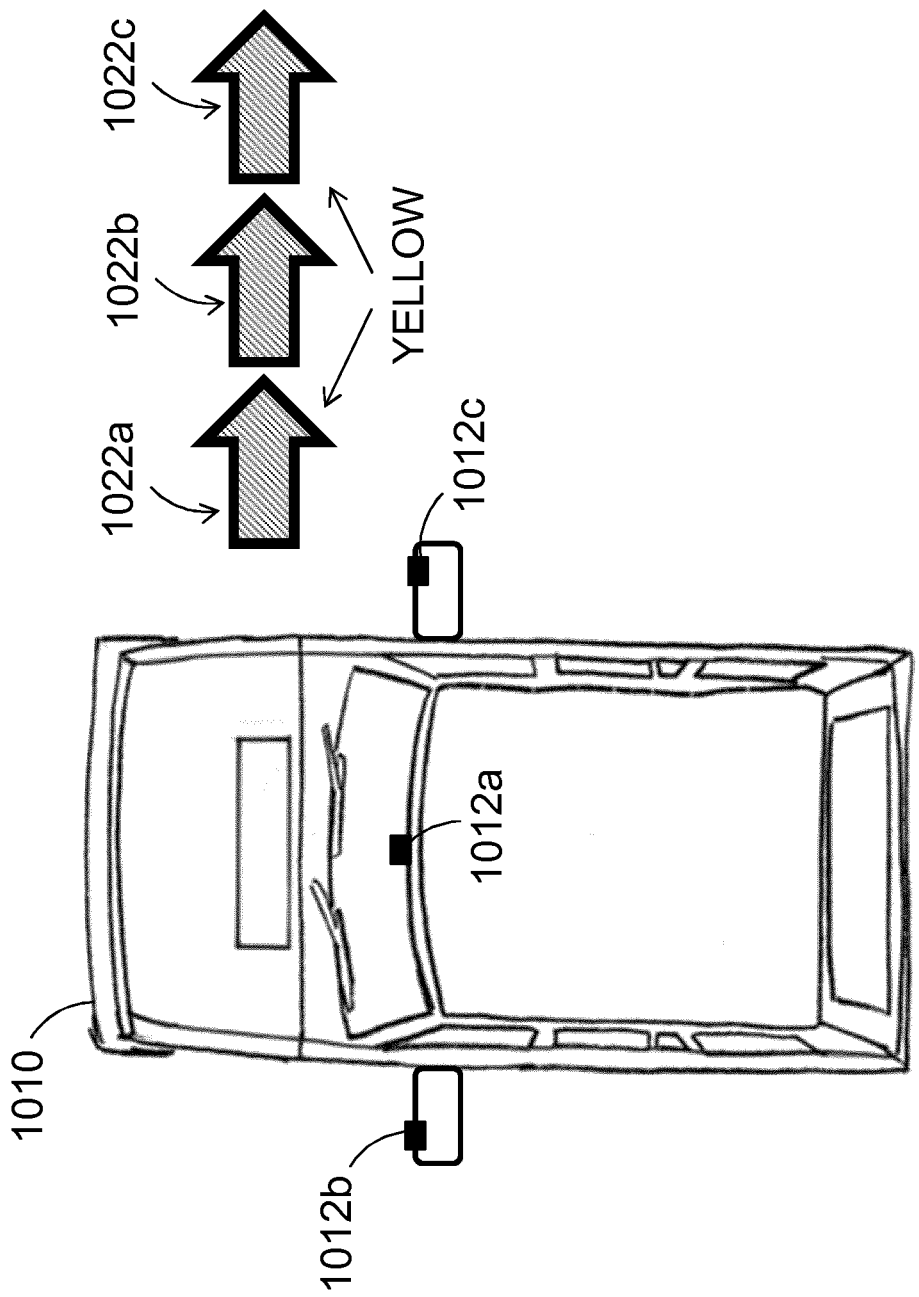
FIG. 13 is a plan view from above of a vehicle having a system for emitting shaped light according to an embodiment of the disclosure, wherein one or more moving visible images are shown being projected to the side of the vehicle to indicate that the vehicle is about to turn right.

Turning now to FIG. 13, the visible images 1022a, 1022b, 1022c comprise flashing yellow coloured arrows to indicate the intended path of the vehicle 1010. Optionally, three arrows 1022a, 1022b, 1022c are projected in a straight line substantially perpendicularly to the vehicle 1010. It is envisaged that in other embodiments, the visible images may comprise a number of arrows greater or fewer than three. Optionally the arrows 1022a, 1022b, 1022c are the same colour and are a single colour and optionally amber or yellow. However, in other envisaged embodiments, the or each arrow may comprise more than one colour and/or each arrow may not be coloured similarly to any of the other arrows. The arrows may optionally be patterned with hashing, cross-hatching and diagonal lines to colour an area of the road that the vehicle intends to move into. Such a coloured area may convey quickly to other road users that the coloured space is reserved for the vehicle 1010 and may assist in clearly communicating the driver's intentions so that the road users can interact more effectively and/or safely.

The flashing arrangement of the projected arrows 1022a, 1022b, 1022c is determined by the controller which may be configured, by means of a computer program, to flash each arrow on and off simultaneously. Optionally the flashing may be achieved by switching the laser sources on and off; and/or by controlling the switching means and/or by providing a physical moveable mask in front of the projection head of the or each light emitter which can be used to rapidly and alternately block and allow the projection of light from the or each light emitter. Additionally or alternatively, flashing may be achieved by means of the controller controlling a beam scanner to temporarily suspend projection of a light signal and then to re-permit the beam scanner to rapidly scan the required arrow graphics to project the visible image(s). Optionally the or each arrow may be arranged to flash on and then flash off simultaneously with each other arrow. Alternatively, where more than one arrow is projected to form the visible image, each arrow may flash on and off sequentially, for example, the arrow 1022a closest to the vehicle may be projected first, then switched off and at the same time the middle arrow 1022b is projected, then projection of that second arrow temporarily suspended whilst at the same time projection of the third arrow 1022c is commenced. The sequence may then return to the first arrow 1022a and so on until the user deactivates the system. In other envisaged embodiments, the arrows may be projected in an arc rather than a straight line.

A sequence of flashing visible images may be beneficially useful for allowing the driver of the vehicle to communicate a warning or alert to other users of the road. Referring in more detail to FIG. 14, there is shown a plan view of a rear portion of a vehicle 1110 that is stationary in a breakdown or other emergency-type situation. The vehicle 1110 is on a motorway where the speed of approach of following vehicle may be relatively fast and therefore their reaction time to the obstacle presented by the stationary vehicle 1110, is short. The vehicle 1110 is equipped with a system (not fully shown) for projecting shaped light from the vehicle 1110 to form visible images 1122a, 1122b, 1122c, 1122d on the road surface to the rear of the vehicle 1110. Visible images 1122a, 1122b, 1122c, 1122d are shown in plan view in order to present a clear indication of the composition of the visible images 1122a, 1122b, 1122c, 1122d as they will appear to other users of the road. The visible images 1122a, 1122b, 1122c, 1122d comprise a series of three arrows 1122a, 1122b, 1122c, optionally each coloured yellow or amber and optionally each patterned with a series of diagonal yellow or amber stripes. The arrows 1122a, 1122b, 1122c are projected externally of the vehicle to convey to other road users that they should drive around the arrows 1122a, 1122b, 1122c and thereby avoid the stationary vehicle 1110. The arrows 1122a, 1122b, 1122c may be projected continuously for a period, may be projected intermittently such that they appear to flash (this may draw further attention to them) or may be projected sequentially such that they progressively each flash on and then off. Of particular benefit is that the arrows 1122a, 1122b, 1122c are projected at a distance $S_3$ (which may be about 5 m to about 7 m or more) to the rear of the vehicle 1110 and this provides an earlier warning of the presence of the vehicle 1110 to other users of the road, who then have more time to steer around the vehicle. Again the use of patterned arrows which colour an area of the road convey a reservation of that road which may encourage other users to avoid that coloured area of road and thereby drive safely around the vehicle 1110.

Additionally or alternatively a further visible image 1122d that is projected by the vehicle 1110 in an emergency scenario is a hazard warning triangle 1122d. Red light may be used to colour the visible image projected onto the surface of the road at a distance $S_4$ to the rear of the vehicle 1110, which distance $S_4$ may be about 10 m, or about 20 m for example. The controller of the system is configured to project an elongated, flashing, red coloured, patterned hazard warning triangle (a symbol with which road users are familiar) which when incident on the flat road surface behind the vehicle 1110 will appear to other road users to be at least similar in size to the size of standard portable hazard warning triangle signs.

In some envisaged embodiments, the system is provided with a sensor or the controller is provided with a data signal from a sensor of another vehicle system, which is configured to detect the presence of a nearby object. Such a sensor optionally may, for example, be a radar, a parking distance control sensor (PDC sensor) or an infra-red sensor. In embodiments where the system is configured to issue a visible image to the side of the vehicle, the use of data from such a sensor may be of particular benefit, but equally, the use of data from such a sensor is beneficial where visible images are projected from the front and/or rear of the vehicle. In such an envisaged embodiment, upon manual or upon automatic triggered activation of the system to project an external visible image, in dependence upon the type of visible image and/or the position externally of the vehicle in which the visible image is to be projected and/or in dependence upon other factors, the controller of the system may first take a decision as to whether projection of the requested visible image is permitted or not permitted. Such other factors may include the ambient light or brightness and the condition of the road surface within a projection envelope of the intended visible image. Such a decision may involve interrogation of the sensor data to determine that the surface external to the vehicle upon which the visible image is to be projected is not obstructed. If an obstruction is detected within a projection envelope or within the viewing zone, the controller may decide to not permit the requested visible image to be projected. Beneficially this avoids projecting an image into or onto another vehicle or road user or pedestrian, which may be disadvantageous.

Conversely, if the sensor does not detect an obstruction, the controller may decide to permit the visible image to be projected. In either situation, the system is optionally configured to continue to monitor data from such sensors. In the instance where the controller denied the image projection request, the sensor data may be monitored for a time period, during which if the obstruction is removed and the controller's decision can be changed to permit projection, then either the visible image is automatically projected or a communication is made to the driver of the vehicle (optionally via a beep, haptic signal or visual display on an in-cabin HMI) to inform him that if the request is placed again, it may be allowed. In the instance where the controller permitted the request, the system may monitor the sensor data and upon an obstruction being detected during projection, projection may be temporarily or permanently suspended automatically.

It can be appreciated that various changes may be made within the scope of the present invention. For example, in other embodiments of the invention it is envisaged that where a camera or other imaging means is provided to monitor the quality of the projected image that it may not be essential for the camera and the light emitter to be mounted proximate to one another, although in doing so, the calibration of the apparatus may be simpler compared to an apparatus wherein the camera and the light emitter are spaced apart.

In other embodiments it is envisaged the or each light emitter may be packaged and mounted such that the projection head is at least in part external to the vehicle such that the emitted light signal(s) is (are) emitted externally of the vehicle and do not first pass through the vehicle such that the light signal emitted by the light source will not suffer from being attenuated, distorted or reflected by part of the vehicle itself.

In other embodiments it is envisaged that a light emitter may be mounted to the vehicle in a variety of locations that may differ to those illustrated. For example, a light emitter may be positioned on the left and/or right side mirrors, around the position of the rear view mirror, proximate to the front headlights, proximate to the rear lights, in the radiator grille and/or in the front and/or rear bumper as examples.

In one envisaged embodiment, the or each light emitter(s) is provided only at the front of the vehicle 10, 110 only and the system is not available for use to the rear of the vehicle 10, 110.

In other embodiments, one or more light emitters are provided at each side of the vehicle. In such an arrangement, the light emitters may be provided along the same lateral axis of the vehicle. In other envisaged embodiments, the light emitter is fixedly mounted to the vehicle and its position is not readily adjustable.

In other envisaged embodiments, the light emitter does not comprise a beam shaper element or an optical fibre. In such embodiments, the light source is mounted to the vehicle in such a position that the light signal output directly therefrom is incident on a surface about the vehicle. In such an embodiment, the light source may be and LED and may be mounted directly upon a mounting means to enable adjustment of the position of the light source (either for calibration or for scanning). In other envisaged embodiments, the light source is fixedly mounted to the vehicle and its position is not adjustable.

It will be understood that the controller, in computing the angle and position needed for each light emitter and/or each beam shaper element including a beam scanner, may use time-averaged first and second data. Furthermore, it will be understood that the order in which certain terms are computed may be adjusted and/or that a combination of calculation and/or referencing and/or approximation may be used. For example, any trigonometric function mentioned computed by the controller so that the or each light emitter can be correctly positioned and/or so that the beam scanner can be accurately controlled to project a desired image may be approximated by a fixed value or a series expansion may be computed to determine the value (such as a Taylor or Euler Series Expansion); further optionally, predefined values for each or any term in a trigonometric relationship may be listed in a look-up table (if appropriate) to be referenced during the computation. Additionally, or alternatively, or in combination, any trigonometric functions may be substituted in order to simplify their computation (and thereby optionally reduce the processing time). It is envisaged that any of the trigonometric functions may be computed by using an expansion series such as a Taylor Expansion Series, or if appropriate an Euler Expansion Series, and/or predetermined and listed in a reference or look-up table. The values, if provided in a look-up table may be linearly interpolated, quadratically interpolated, exponentially interpolated or interpolated using any other suitable mathematical method that would provide a suitable approximate value for the trigonometric function being interpolated.

In other embodiments it is envisaged each light source may not be of the same wavelength. Each light source is preferably a coherent light source and in envisaged embodiments, each light source is either a laser or an LED. Each light source emits electromagnetic radiation in the visible range of the electromagnetic spectrum.

In other envisaged embodiments, the one or more light sources may optionally comprise one or more tuneable lasers such that a single light source can be used to emit different colours (wavelengths) of light, albeit where the one or more light sources comprises only one tuneable laser, only a single colour of light can be emitted at a time.

The foregoing disclosure has been written particularly in the context of a vehicle being driven on roads in the UK. However, it is recognised that in other jurisdictions, legal requirements for road users, road signage and terminology relating to the same may differ from that disclosed herein. For example, where a vehicle has been illustrated as driving along the left-hand lane of a single carriageway, it is recognised that in other jurisdictions, vehicles are driven along the right-hand lane of a single carriage way. This and other aspects of the present disclosure should not be construed in any way as limiting the application of the invention to only left-hand drive vehicles and/or to vehicles for the UK. Indeed it will be recognised that subject to other legal restrictions governing road use, road signage and the use of coloured and/or flashing light emitted by vehicles that the present invention is not in any way limited in its application.

As used herein the term "pavement" should be taken to be synonymous with the term "sidewalk" and the term "boot" should be taken to be synonymous with the term "trunk".

The terms "scan", "raster", "rastered", "vectored" and "scanned" as used herein should be interpreted to include continuous, interrupted, step-wise movement of the light emitted.

This application claims priority from UK patent application numbers GB1315613.8, GB1315614.6 and GB1315615.3, the contents of which are incorporated herein by reference.

The invention claimed is:

1. A system for emitting shaped light from a vehicle and projecting the shaped light onto a surface external to the vehicle, the surface external to the vehicle comprising a road or other terrain, a sidewalk, a kerb, a hard-shoulder, a wall, or a verge, the system comprising a controller, a sensor for detecting the presence of a nearby object, a plurality of light sources and at least one light emitter, wherein the at least one light emitter is arranged to emit at least a first light signal directed away from the vehicle towards said surface external to the vehicle, the light emitter comprising a projection head arranged to direct light externally to the vehicle and a beam shaper element, wherein the controller is configured to receive data from the sensor and to determine whether or not an obstruction is located within a projection envelope or within a viewing zone in dependence on the data, and wherein the controller is configured to prevent the shaped light from being projected in dependence on an obstruction being located in the projection envelope or within the viewing zone.

2. A system as claimed in claim 1, comprising cooling means for controlling the temperature of the one or more light sources.

3. A system as claimed in claim 1, comprising a protective housing, wherein at least said light source is disposed within said protective housing.

4. A system as claimed in claim 1, wherein the at least one light source comprises at least three light sources comprising a red light source, a green light source and a blue light source.

5. A system as claimed in claim 1, wherein said light sources are lasers.

6. A system as claimed in claim 1, wherein the beam shaper element comprises any one or any combination of: a transmissive LCD, a lens, a collimator, a diffuser, a mask, a gobo, a static slide, a scanning device, a rastering device and/or a vectoring device.

7. A system as claimed in claim 6, wherein the scanning device, rastering device or vectoring device comprises any one or more or a combination of: a mirror galvanometer scanner, a MEMS scanner, an acousto-optic modulator and a piezo-driven scanner.

8. A system as claimed in claim 1, wherein the controller is configured to receive an input indicative of a signal from one or more accelerometers and/or gyroscopes comprising first data relating to the orientation of the vehicle in three-dimensions, and the controller is configured to receive second data relating to the orientation in three dimensions of the projection head and/or beam shaper element of the or each light emitter and in dependence upon said first data and said second data, the controller being configured to control the output of the or each light emitter such that the projected shaped light emitted by the system is appropriately positioned on said surface external to the vehicle and at an appropriate distance from the vehicle.

9. A system as claimed in claim 1, wherein each of the at least one emitters is coupled to each of the plurality of light sources by one or more optical fibers via a combiner and a switching means, wherein the controller is coupled to each light source of the plurality of light sources for activating and deactivating each light source and wherein the controller is coupled to the switching means for selecting color of light to be transmitted via the one or more optical fibers to each of the at least one light emitters.

10. A system as claimed in claim 1, wherein the controller is further configured to receive a first input indicative of a signal from one or more accelerometers and/or gyroscopes, and a second input indicative of a current vehicle suspension height and to determine an orientation of the projection head in dependence on the first input and the second input.

11. A system as claimed in claim 1, wherein the system further comprises a camera, and the controller is configured to receive an input indicative of an image obtained by the camera, and further wherein the system is configured to determine whether or not the image projected onto the surface external to the vehicle corresponds to the intended image, and to deactivate or temporarily suspend the system if the image projected onto the surface external to the vehicle does not correspond to the intended image.

12. A vehicle comprising a system as claimed in claim 1.

13. A vehicle as claimed in claim 12, wherein the first light signal comprises shaped light comprising one or more visible images, said one or more visible images comprising: a moving element and/or a colored element and/or a graphical referencing element suitable for communicating an intention of the driver of the vehicle and/or for assisting a driver of the vehicle in gauging a distance relative to the vehicle.

14. A vehicle as claimed in claim 13, wherein the first light signal comprises a graphical referencing element for indicating the size of the vehicle, comprising a pair of spaced parallel straight longitudinal lines along the path ahead of the vehicle, wherein the transverse position of each of said spaced and parallel straight lines is determined by said controller such that the pair is spaced by a distance that is no less than the width of the vehicle.

15. A vehicle as claimed in claim 12, comprising a protective housing, wherein at least said light source is disposed within said protective housing, and said protective housing is disposed in the boot of the vehicle.

16. A vehicle as claimed in claim 12, wherein the first light signal comprises a visible warning externally of the vehicle in the region of an openable door of the vehicle, which visible warning is emitted in dependence upon the system determining that an openable door of the vehicle is about to be opened or has been opened and which visible warning is projected onto a surface external to the vehicle in the region of the openable door of the vehicle, as or before the openable door of the vehicle is opened.

17. A vehicle comprising a system for emitting shaped light and for projecting the emitted shaped light onto a surface external to the vehicle, the projected shaped light thereby forming one or more visible images on said surface external to the vehicle, which one or more visible images comprise a graphical referencing element suitable for assisting a driver of the vehicle in gauging a distance relative to the vehicle, the graphical referencing element comprising a visible image indicative of the width of the vehicle, wherein the system is configured to project a graphical referencing element for gauging a distance relative to the vehicle comprising: a primary pair of spaced and parallel straight longitudinal lines along the path ahead of the vehicle; a single straight transverse line across the path ahead of the vehicle extending between and terminating on said straight longitudinal lines of the primary pair; and an arrow commencing on a medial point of said single straight transverse line and extending longitudinally therefrom and extending beyond the termination of the straight longitudinal lines of said primary pair such that the point of the arrow provides an indicator of the centremost point of a lane on a road.

18. A vehicle according to claim 17, wherein the system is configured to project a graphical referencing element for gauging a distance relative to the vehicle comprising: a primary pair of spaced and parallel straight longitudinal lines along the path ahead of the vehicle; a primary pair of spaced and parallel straight transverse lines across the path ahead of the vehicle; and a grid comprising a plurality of straight transverse lines across the path ahead of the vehicle and a plurality of straight longitudinal lines along the path ahead of the vehicle, which grid is disposed entirely within and spaced from a perimeter defined by said primary pairs of spaced and parallel straight longitudinal and transverse lines.

19. A vehicle comprising a system for emitting shaped light and for projecting the emitted shaped light onto a surface external to the vehicle, the surface external to the vehicle comprising a road, the projected shaped light thereby forming one or more visible images on said surface external to the vehicle, which one or more visible images comprise a graphical referencing element suitable for assisting a driver of the vehicle in gauging a distance relative to the vehicle, the graphical referencing element comprising:

- a visible image indicative of the width of the vehicle, comprising a pair of spaced and parallel straight longitudinal lines along the path ahead of the vehicle which are aligned with the path of the wheels of the vehicle or which are spaced apart in a transverse direction by a distance which is similar or equal to the maximum width of the vehicle; and
- a pair of spaced and parallel straight longitudinal lines along the path ahead of the vehicle indicating an outer boundary of a lane of the road.

20. A vehicle as claimed in claim 19, wherein the visible image indicative of the width of the vehicle comprises a pair of spaced and parallel straight longitudinal dashed lines.

* * * * *